(12) United States Patent
Dalal et al.

(10) Patent No.: US 7,487,308 B1
(45) Date of Patent: Feb. 3, 2009

(54) IDENTIFICATION FOR RESERVATION OF REPLACEMENT STORAGE DEVICES FOR A LOGICAL VOLUME TO SATISFY ITS INTENT

(75) Inventors: Chirag Deepak Dalal, Maharaahtra (IN); Vaijayanti Rakshit Bharadwaj, Sunnyvale, CA (US); Vivek V. Gupta, Aundh (IN)

(73) Assignee: Symantec Operating Corporation, Cupertino, CA (US)

( * ) Notice: Subject to any disclaimer, the term of this patent is extended or adjusted under 35 U.S.C. 154(b) by 100 days.

(21) Appl. No.: 10/724,245

(22) Filed: Nov. 28, 2003

(51) Int. Cl.
*G06F 13/00* (2006.01)
*G06F 12/00* (2006.01)

(52) U.S. Cl. .................. 711/162; 711/100; 711/112; 711/154; 711/170

(58) Field of Classification Search ............ 711/100, 711/111, 112, 114, 154, 170, 161, 162
See application file for complete search history.

(56) References Cited

U.S. PATENT DOCUMENTS

| | | | |
|---|---|---|---|
| 5,615,352 A * | 3/1997 | Jacobson et al. ........... 711/114 |
| 6,681,310 B1 * | 1/2004 | Kusters et al. ............ 711/202 |
| 6,904,599 B1 * | 6/2005 | Cabrera et al. ............ 719/328 |
| 7,143,259 B2 | 11/2006 | Dalal et al. .............. 711/170 |
| 7,143,260 B2 | 11/2006 | Dalal et al. .............. 711/170 |
| 7,159,093 B2 | 1/2007 | Dalal et al. .............. 711/170 |
| 7,162,575 B2 | 1/2007 | Dalal et al. .............. 711/112 |
| 2004/0120225 A1 | 6/2004 | Dalal et al. ............. 369/30.04 |

* cited by examiner

*Primary Examiner*—Tuan V. Thai
(74) *Attorney, Agent, or Firm*—Campbell Stephenson LLP

(57) ABSTRACT

A method, system, and computer program product for identifying and reserving suitable replacement storage devices for use when a storage device underlying a logical volume fails or when the size of the volume is to be increased. Replacement devices are reserved if they conform to the intent of a creator of the logical volume and at the time of creation or reconfiguration of the logical volume. Volume management operations like resizing the volume and evacuating data from the volume use the reserved disks that have already been allocated as suitable to preserve the intent of the creator of the logical volume. Reserving replacement disks in advance ensures that a backup disk is available and eliminates the need to perform a lengthy, time-consuming search for a suitable replacement disk that conforms to the intent of the logical volume.

26 Claims, 16 Drawing Sheets

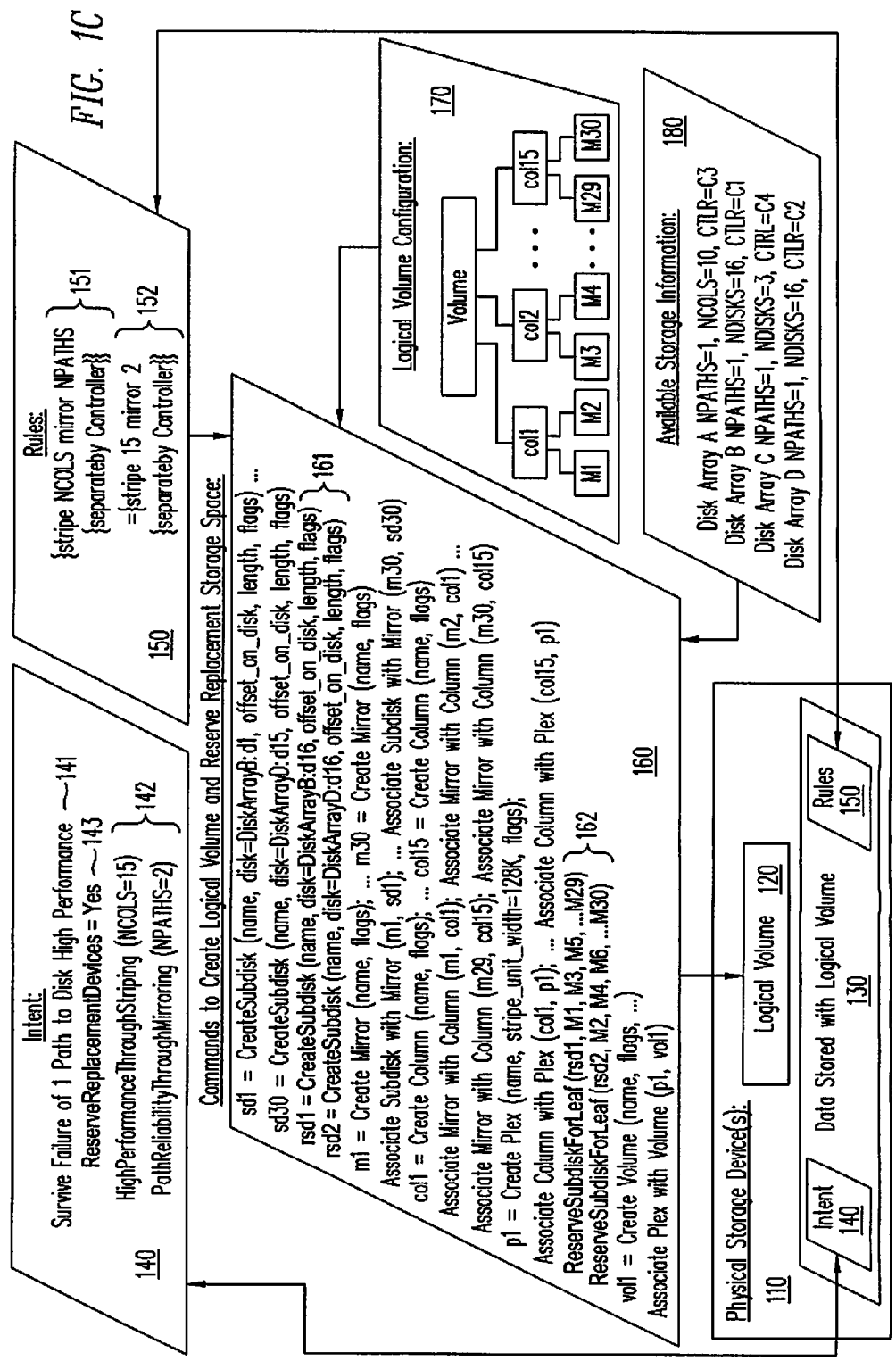

*Mirrored Configuration (RAID-1)*

*RAID-3*

*RAID-5*

Create Logical Volume Operation

*Other Operations on Logical Volumes*

Reserve Space at Time of Volume Creation

*Identify Physical Storage Devices for Leaf Node*

IDENTIFICATION FOR RESERVATION OF REPLACEMENT STORAGE DEVICES FOR A LOGICAL VOLUME TO SATISFY ITS INTENT

Portions of this patent application contain materials that are subject to copyright protection. The copyright owner has no objection to the facsimile reproduction by anyone of the patent document, or the patent disclosure, as it appears in the Patent and Trademark Office file or records, but otherwise reserves all copyright rights whatsoever.

BACKGROUND OF THE INVENTION

As businesses increasingly rely on computers for their daily operations, managing the vast amount of business information generated and processed has become a significant challenge. Most large businesses have a wide variety of application programs managing large volumes of data stored on many different types of storage devices across various types of networks and operating system platforms. These storage devices can include tapes, disks, optical disks, and other types of storage devices and often include a variety of products produced by many different vendors. Each product typically is incompatible with the products of other vendors.

Historically, in storage environments, physical interfaces from host computer systems to storage consisted of parallel Small Computer Systems Interface (SCSI) channels supporting a small number of SCSI devices. Whether a host could access a particular storage device depended upon whether a physical connection from the host to the SCSI device existed. Allocating storage for a particular application program was relatively simple.

Today, storage area networks (SANs) including hundreds of storage devices can be used to provide storage for hosts. SAN is a term that has been adopted by the storage industry to refer to a network of multiple servers and connected storage devices. A SAN can be supported by an underlying fibre channel network using fibre channel protocol and fibre channel switches making up a SAN fabric. Alternatively, a SAN can be supported by other types of networks and protocols, such as an Internet Protocol (IP) network using Internet SCSI (iSCSI) protocol. A fibre channel network is used as an example herein, although one of skill in the art will recognize that a storage area network can be implemented using other underlying networks and protocols.

Fibre channel technology offers a variety of topologies and capabilities for interconnecting storage devices, subsystems, and server systems. A variety of interconnect entities, such as switches, hubs, and bridges, can be used to interconnect these components. These varying topologies and capabilities allow storage area networks to be designed and implemented that range from simple to complex configurations. Accompanying this flexibility, however, is the complexity of managing a very large number of devices and allocating storage for numerous application programs sharing these storage devices. Performing a seemingly simple allocation of storage for an application program becomes much more complex when multiple vendors and protocols are involved.

At startup time, typically every host/server computer system or device on a fibre channel network logs on, providing an identity and a startup address. A fibre channel switch catalogs the names of all visible devices and hosts and can direct messages between any two points in the fibre channel network. For example, some switches can connect up to 224 devices in a cross-point switched configuration. The benefit of this topology is that many devices can communicate at the same time and the media can be shared. Redundant fabric for high-availability environments is constructed by connecting multiple switches to multiple hosts.

Often, vendors of storage devices provide their own application programming interfaces (APIs) and/or command line utilities for using the specialized features of their own storage devices, such as multiple paths to a storage device, but these APIs and command line utilities are not compatible from vendor to vendor. Allocating storage devices for use by a particular application program can be a difficult task when the storage is to be provided by multiple storage devices via a SAN, and each possible storage device has its own specialized features.

One approach to making storage devices easier to use and configure is to create an abstraction that enables a user to view storage in terms of logical storage devices, rather than in terms of the physical devices themselves. For example, physical devices providing similar functionality can be grouped into a single logical storage device that provides the capacity of the combined physical storage devices. Such logical storage devices are referred to herein as "logical volumes," because disk volumes typically provide the underlying physical storage.

Configuring a logical volume is a complex task when tradeoffs between performance, reliability, and cost are taken into account. Furthermore, as mentioned above, different vendors provide different tools for configuring logical volumes, and a storage administrator in a heterogeneous storage environment must be familiar with the various features and interfaces to establish and maintain a storage environment with the desired capabilities. Furthermore, a storage administrator must keep track of how particular volumes are implemented so that subsequent reconfigurations of a logical volume do not render the logical volume unsuitable for the purpose for which the logical volume was created.

Logical volumes can be configured to withstand failures of disks using techniques such as mirroring and striping, which are described in further detail below. When a disk fails, it is necessary to find a replacement disk that is suitable for the purpose for which the logical volume was created. For example, a disk configured as part of a mirrored configuration may not be suitable as a replacement disk for a logical volume requiring a striped configuration. Furthermore, finding a suitable replacement disk is dependent upon the number and types of disks available at the time of failure and is a time-consuming operation. It is possible that no suitable disk is available at the time of failure, thereby extending the time during which the logical volume may perform poorly or fail to meet storage service level agreements.

A solution is needed that enables a replacement disk to be located quickly upon failure of a disk providing underlying storage for a logical volume. The replacement disk should be suitable for the purpose for which the logical volume was created and made available without a lengthy search and with a low likelihood that a replacement disk cannot be found.

SUMMARY OF THE INVENTION

The present invention provides a method, system, and computer program product for identifying and reserving suitable replacement disks for use when a disk underlying a logical volume fails or is needed to store additional data. Replacement disks are reserved only if they conform to the intent of a creator of the logical volume. The creator of a logical volume defines certain characteristics of that logical volume, such as a number of copies of data to be maintained, a level of performance required of the logical volume, or a requirement that one or more snapshots of the logical volume can be preserved representing the data at different points in time. These characteristics are stored in the form of an intent with the logical volume, along with a corresponding set of one or more rules for configuring the logical volume.

Replacement disks to be used upon failure of one of the disks underlying the logical volume are reserved at the time of creation or reconfiguration of the logical volume. Volume management operations like resizing the volume and evacuating data from the volume use the reserved disks that have already been allocated as suitable to preserve the intent of the creator of the logical volume. Reserving replacement disks in advance ensures that a backup disk is available and eliminates the need to perform a lengthy, time-consuming search for a suitable replacement disk that conforms to the intent of the logical volume. The volume management operations can follow the rules for configuring the logical volume stored with the logical volume. By ensuring that the logical volume consistently conforms to rules fulfilling the original intent, a consistent level of availability of the logical volume can be achieved to fulfill contractual availability requirements for storage service level agreements.

BRIEF DESCRIPTION OF THE DRAWINGS

The present invention may be better understood, and its numerous objects, features and advantages made apparent to those skilled in the art by referencing the accompanying drawings.

FIG. 1C shows examples of commands used to reserve replacement storage devices for the logical volume of FIGS. 1A and 1B.

FIGS. 2 through 7 show alternative storage configurations and corresponding logical volume configuration trees.

FIG. 2 shows an example configuration of two logical volumes showing relationships between physical disks, disk groups, logical disks, plexes, subdisks, and logical volumes.

FIG. 4 shows an example of a RAID-3 storage configuration.

FIG. 5 shows an example of a RAID-5 storage configuration.

FIG. 6 shows an example of a mirrored-stripe (RAID-1+0) storage configuration and corresponding logical volume configuration.

FIG. 7 shows an example of a striped-mirror (RAID-0+1) storage configuration and corresponding logical volume configuration.

Logical volume configuration trees such as those described with reference to FIGS. 2 through 7 are used to reserve replacement storage devices for a logical volume, as described with reference to FIGS. 8A through 9B.

Figure 8A:
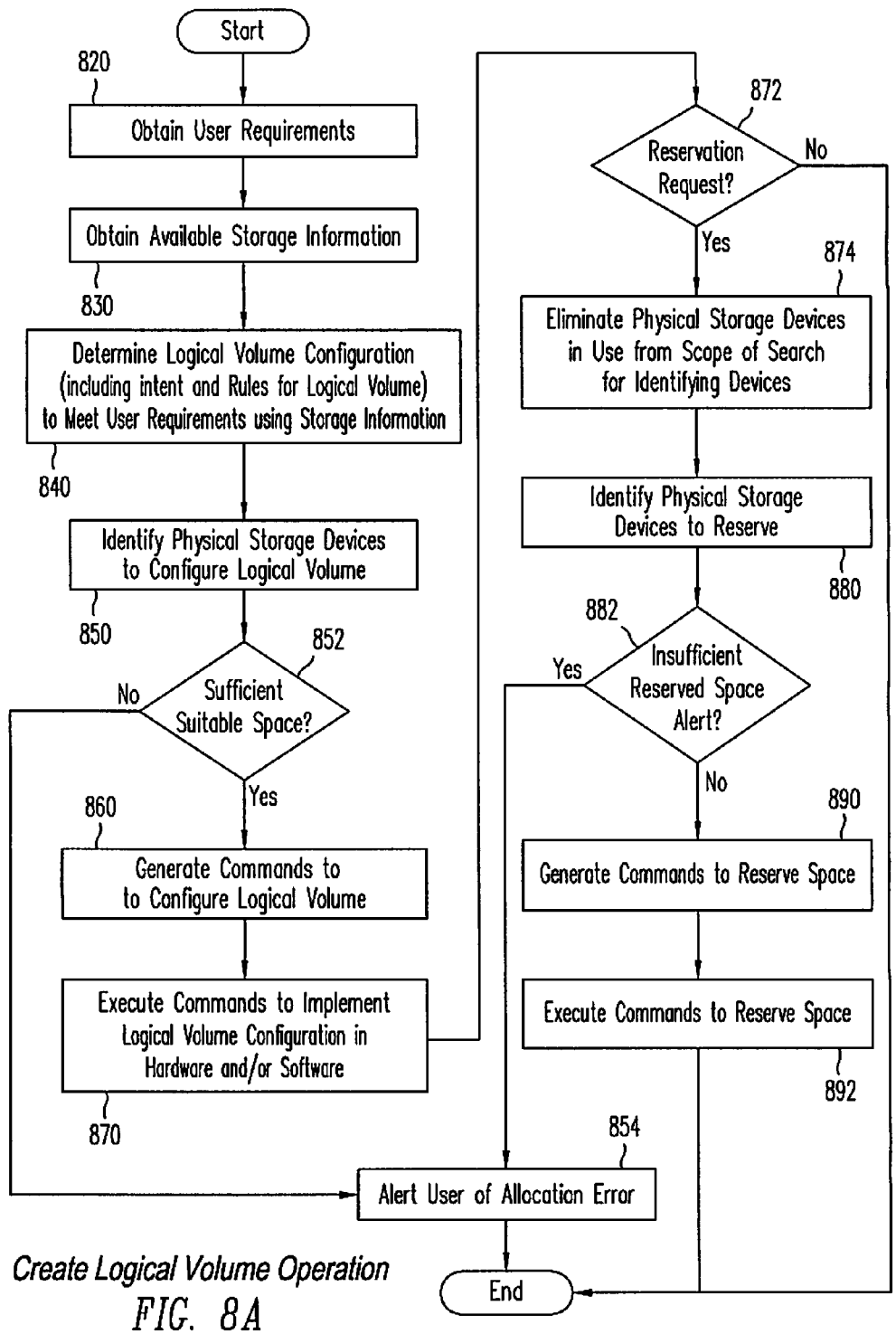

FIG. 8A is a flowchart for reserving replacement storage space at the time of logical volume creation in accordance with one embodiment of the present invention.

Figure 8B:
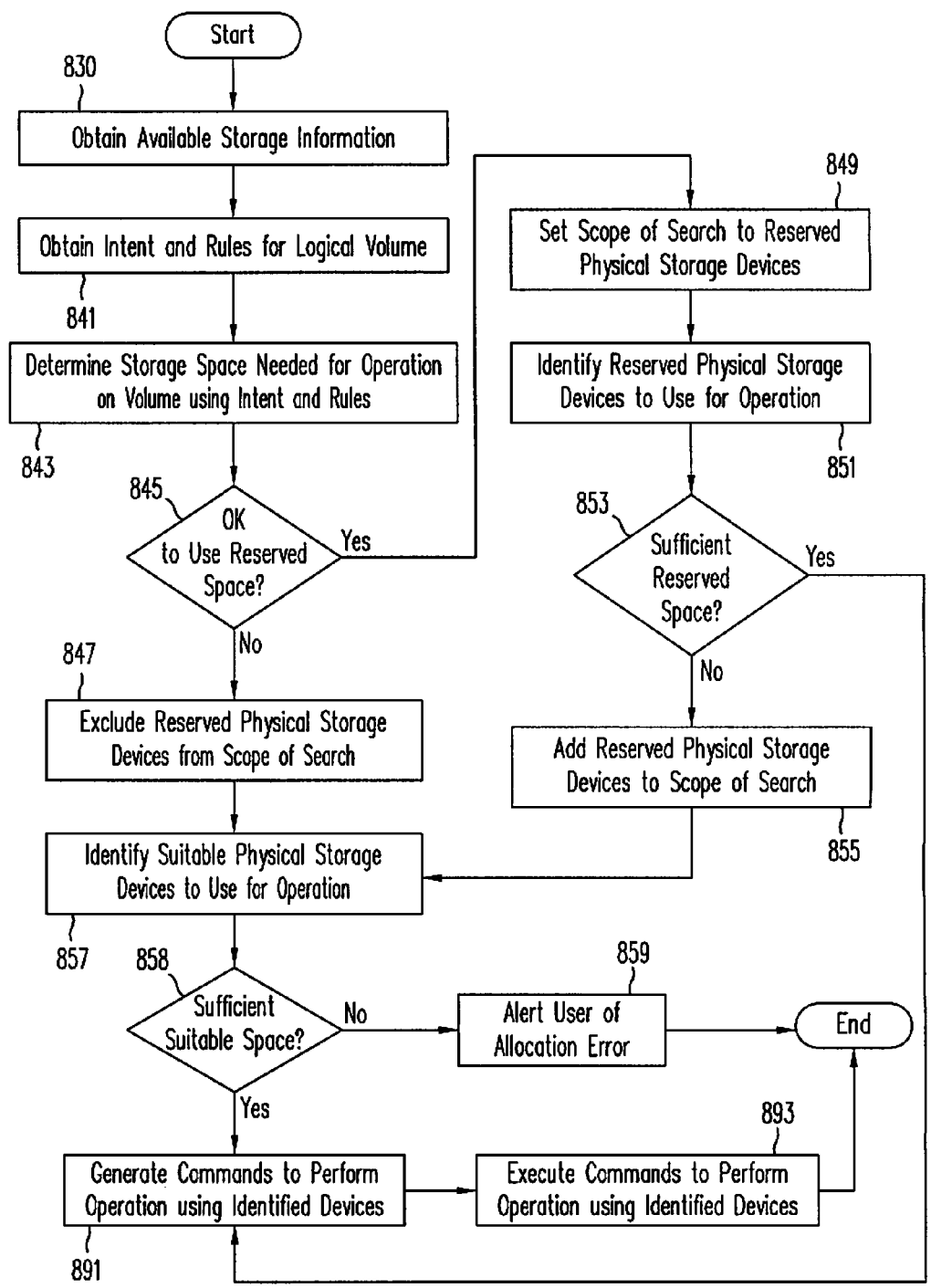

FIG. 8B is a flowchart for performing other types of operations on logical volumes in accordance with one embodiment of the present invention.

Figure 9A:
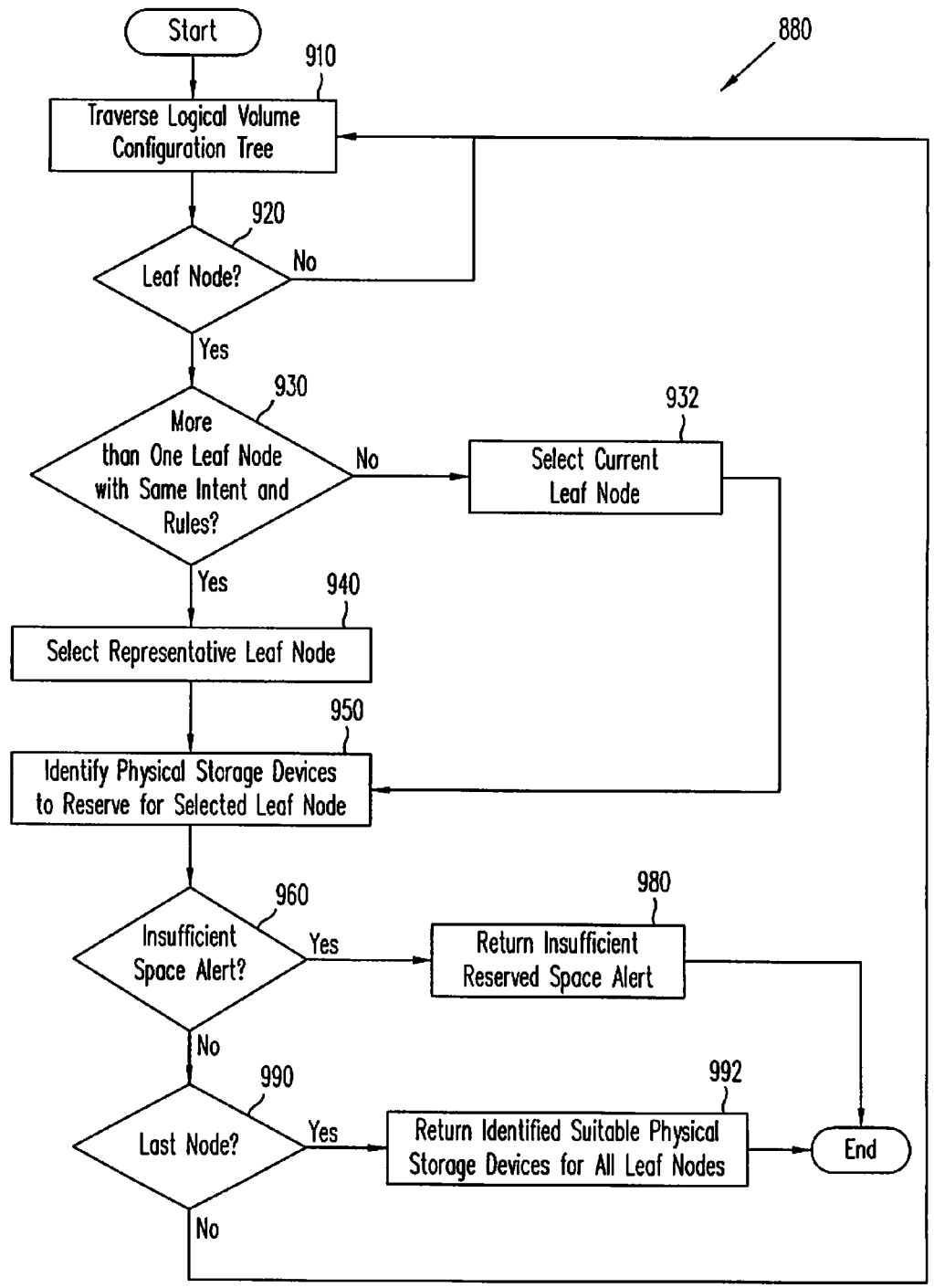

FIG. 9A is a flowchart showing the operation of the "Identify Physical Storage Devices to Reserve" step of the flowchart of FIG. 8A.

Figure 9B:
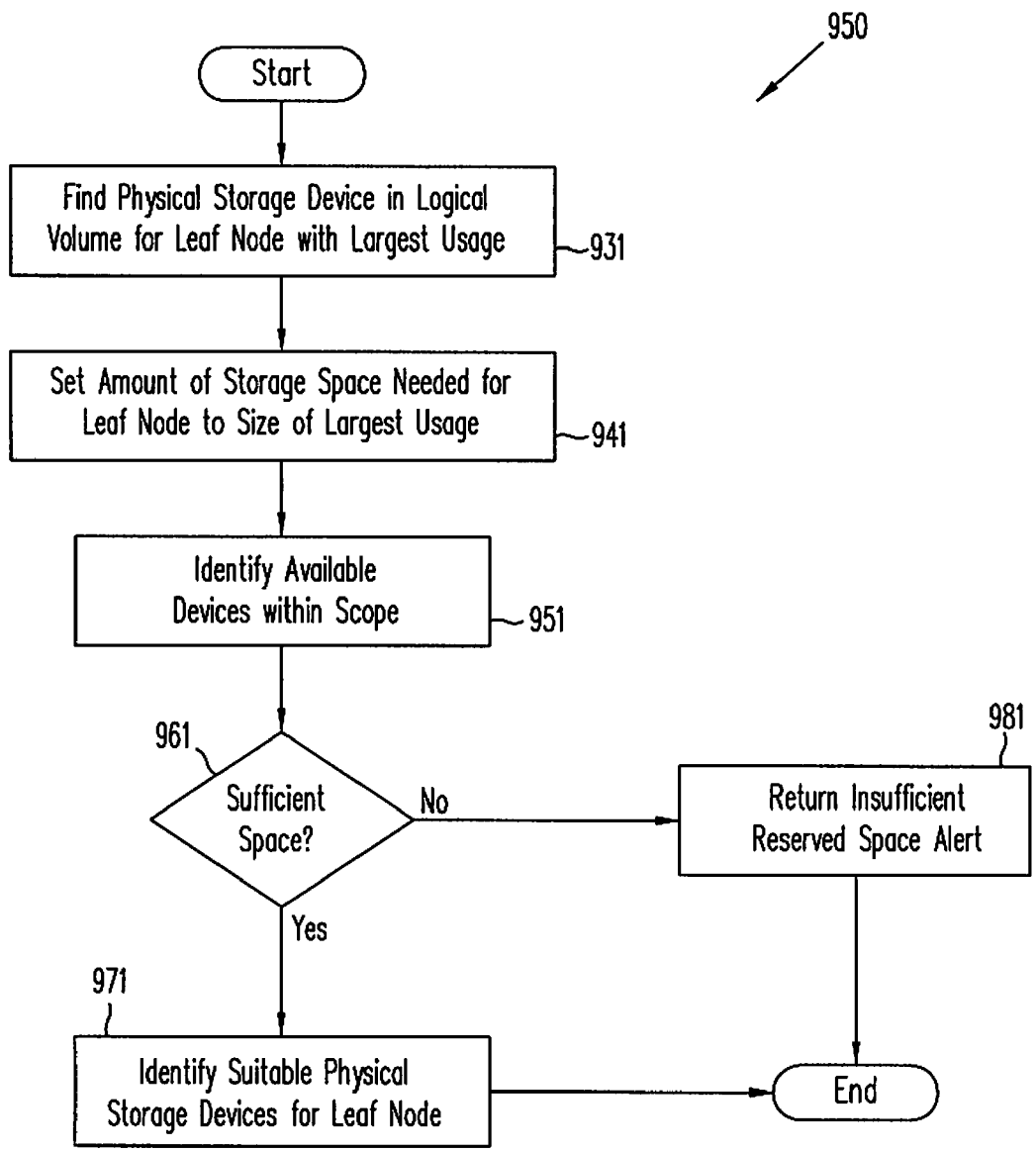

FIG. 9B is a flowchart of the "Identify Physical Storage Devices to Reserve for Selected Leaf Node" step of the flowchart of FIG. 9A.

Figure 10:
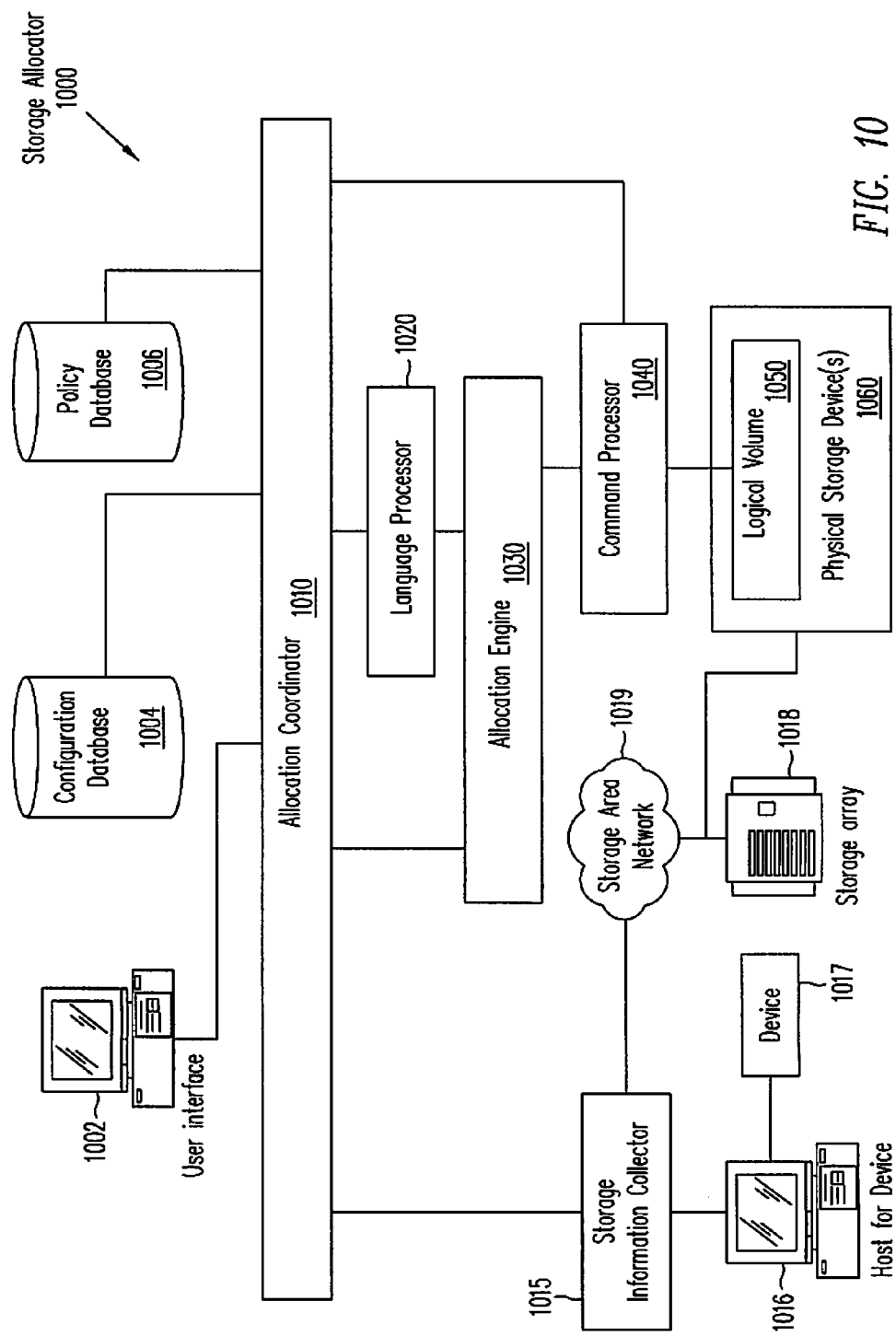

FIG. 10 is a diagram of a system implementing one embodiment of the present invention.

Figure 11:
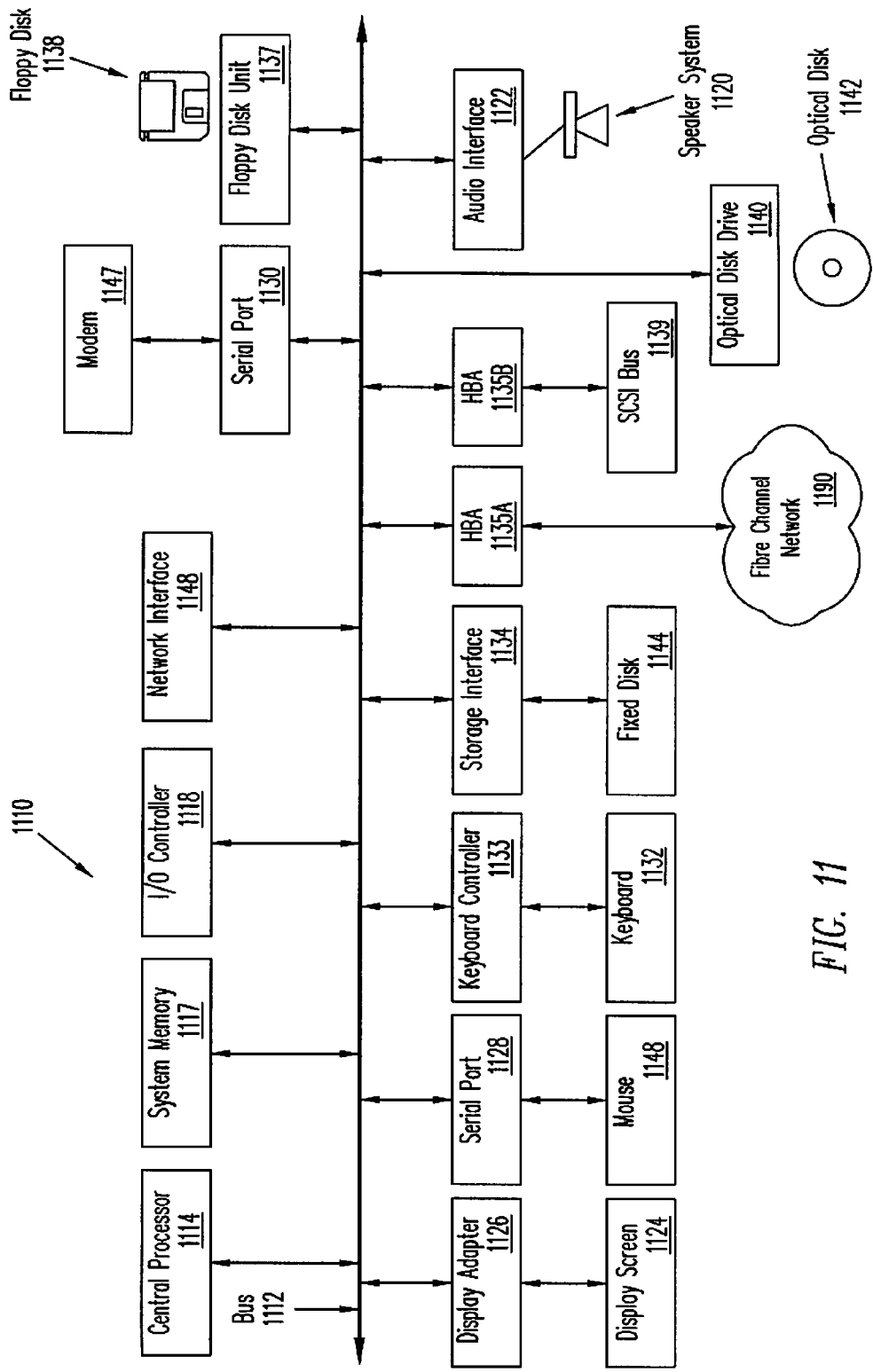

FIG. 11 is a block diagram illustrating a computer system suitable for implementing embodiments of the present invention.

Figure 12:
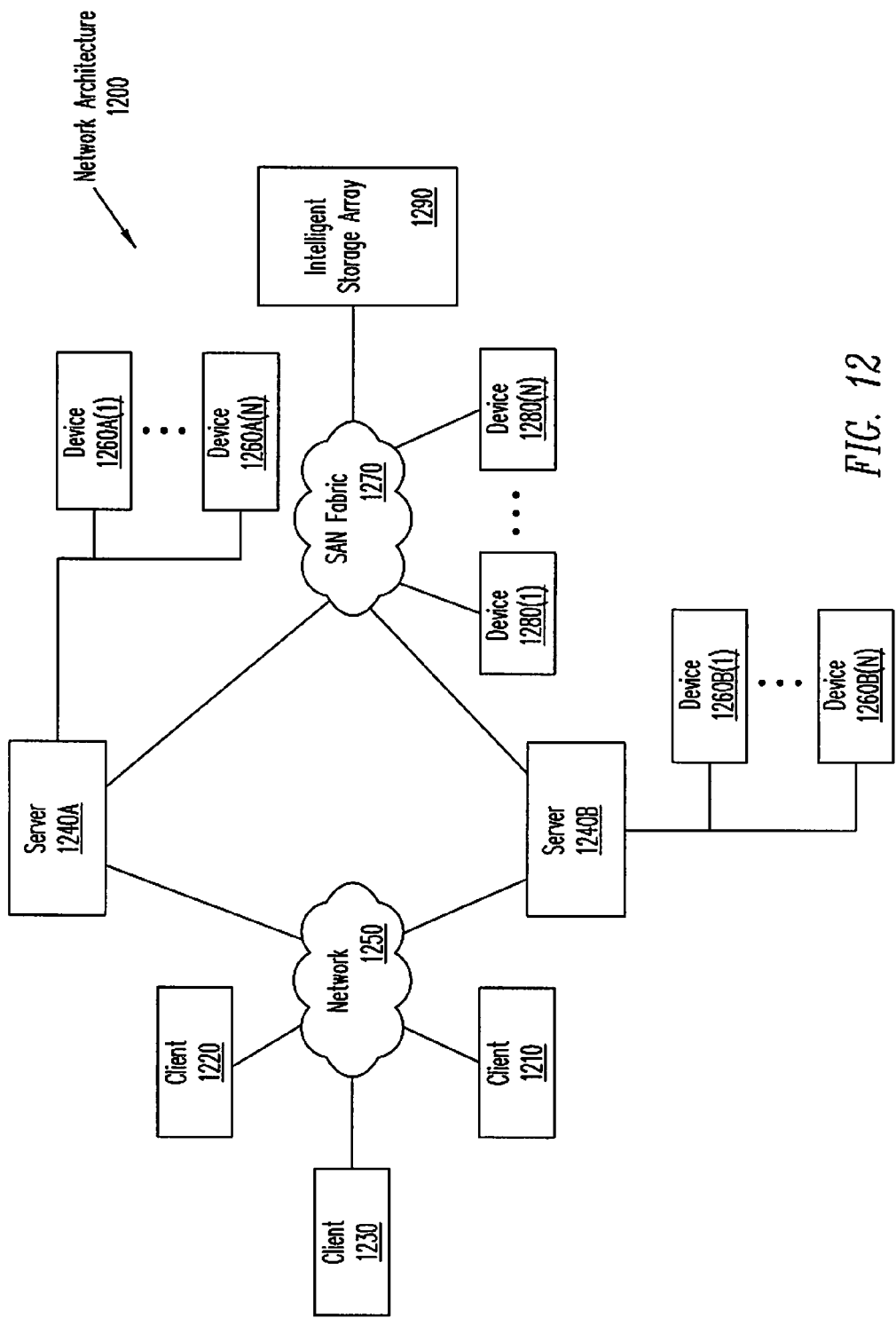

FIG. 12 is a block diagram illustrating a network environment in which storage management services according to embodiments of the present invention may be used.

The use of the same reference symbols in different drawings indicates similar or identical items.

DETAILED DESCRIPTION

For a thorough understanding of the subject invention, refer to the following Detailed Description, including the appended Claims, in connection with the above-described Drawings. Although the present invention is described in connection with several embodiments, the invention is not intended to be limited to the specific forms set forth herein. On the contrary, it is intended to cover such alternatives, modifications, and equivalents as can be reasonably included within the scope of the invention as defined by the appended Claims.

In the following description, for purposes of explanation, numerous specific details are set forth in order to provide a thorough understanding of the invention. It will be apparent, however, to one skilled in the art that the invention can be practiced without these specific details.

References in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Introduction

Today, with the proliferation of intelligent disk arrays, the storage devices available in a disk array provide many features. Through SANs, hosts now have access to hundreds of thousands of storage devices having a variety of properties. Because of these factors, configuring logical volumes in a given environment is no longer a trivial problem.

A solution has been developed by Veritas Software Corporation of Mountain View, Calif. for preserving the intent of a logical volume creator with the logical volume. This solution is described in co-pending application Ser. No. 10/324,858, filed on Dec. 20, 2002, entitled "Preservation Of Intent Of A Volume Creator With A Logical Volume" and naming Chirag Deepak Dalal, Vaijayanti Rakshit Bharadwaj, Pradip Madhukar Kulkarni, and Ronald S. Karr as inventors, the application being incorporated herein by reference in its entirety.

In this solution, the creator of a logical volume defines certain characteristics of that logical volume, such as a number of copies of data to be maintained, a level of performance required of the logical volume, or a requirement that one or more snapshots of the logical volume can be preserved representing the data at different points in time. In response to the user's requirements, the system explores the possibilities for providing the characteristics in the existing storage environment. The system then implements the logical volume and stores the intent, along with a corresponding set of rules for configuring the logical volume, with the logical volume. As a result, volume management operations like resizing the volume and evacuating data from the volume use the rules to preserve the intent of the creator.

The present invention identifies and reserves suitable replacement storage devices that conform to the intent of the logical volume in advance, at the time of creation or reconfiguration of the logical volume. By ensuring that the logical volume consistently conforms to rules fulfilling the original intent, a consistent level of availability of the logical volume can be achieved to fulfill contractual availability requirements for storage service level agreements.

Figure 1A:
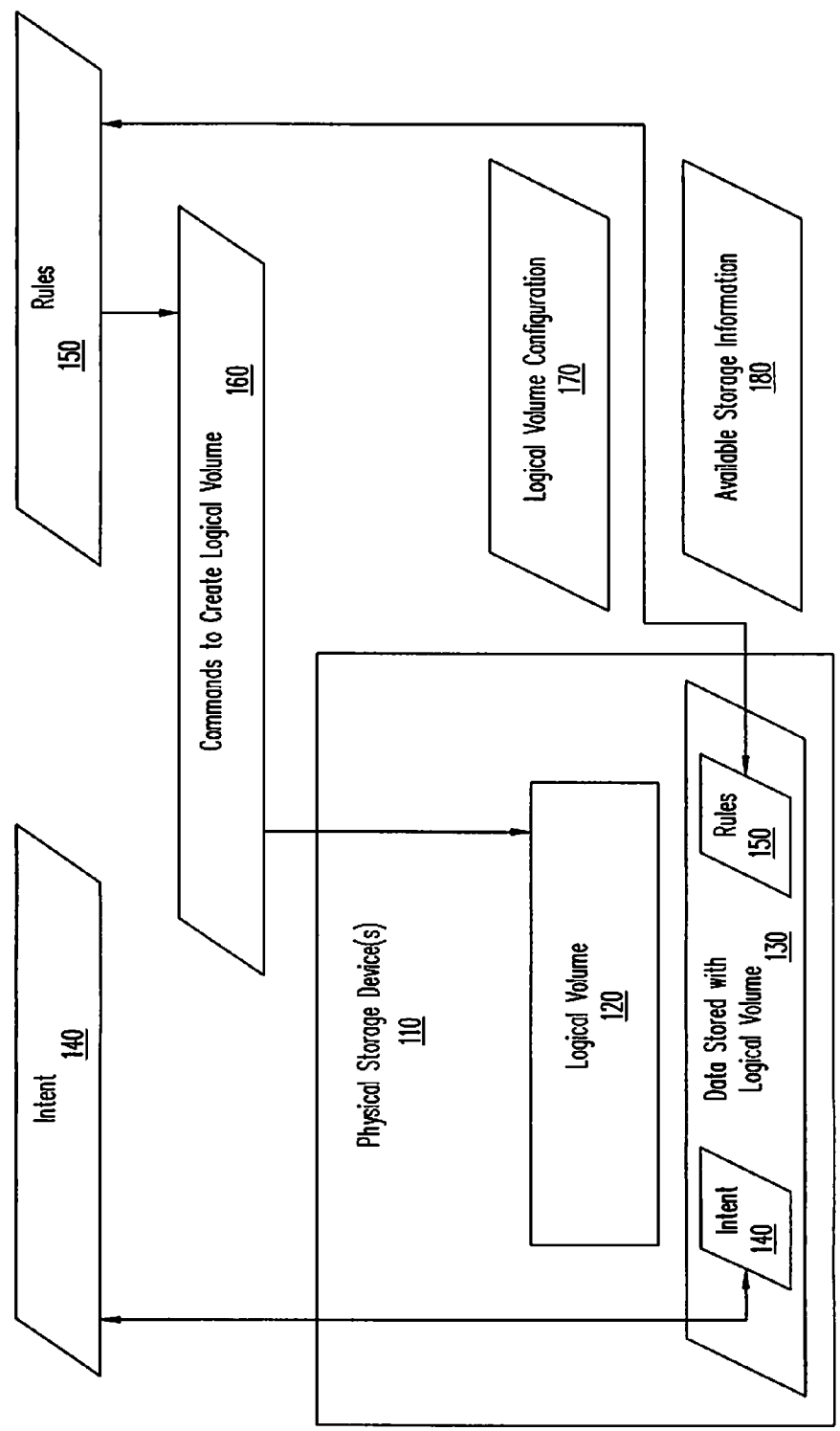
FIG. 1A is an example of a logical volume with stored intent and rules for configuring the logical volume.

FIG. 1A is an example of a logical volume with stored intent and rules for configuring the logical volume. Physical storage device(s) 110 are used to provide a logical volume 120. Data Stored with Logical Volume 130 includes an intent 140, which preserves the original intent of the volume creator for logical volume 120, and rules 150, which were used to configure logical volume 120. Rules 150 correspond to commands 160 used to create and/or configure logical volume 120 having a logical volume configuration 170, which is typically in the form of a tree or hierarchy. Commands 160 are generated using available storage information 180 to identify the available physical storage devices that can be used to configure the logical volume and using logical volume configuration 170 to identify the structure of the logical volume. Each of these concepts is explained in further detail in co-pending application Ser. No. 10/327,380, filed on Dec. 20, 2002, entitled "Development Of A Detailed Logical Volume Configuration From High-Level User Requirements" and naming Chirag Deepak Dalal, Vaijayanti Rakshit Bharadwaj, Pradip Madhukar Kulkarni, Ronald S. Karr, and John A. Colgrove as inventors, the application being incorporated herein by reference in its entirety.

Figure 1B:
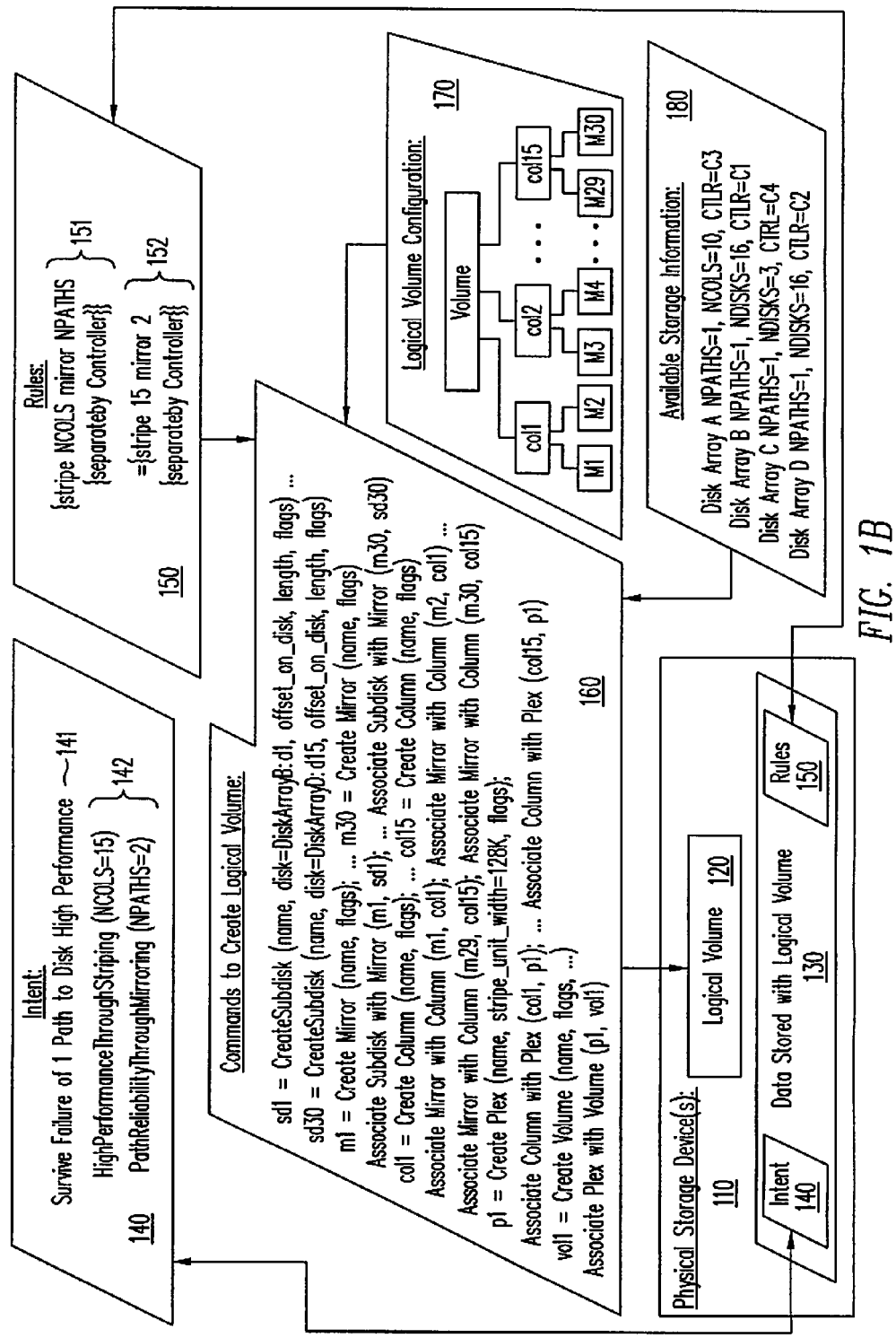
FIG. 1B shows a more detailed example of the contents of the logical volume of FIG. 1A.

FIG. 1B shows a more detailed example of the contents of the logical volume of FIG. 1A, and FIG. 1C shows examples of commands used to reserve replacement storage devices for logical volume 120. These figures are discussed in further detail following a background discussion of storage configuration alternatives.

FIGS. 2 through 7 provide background information for storage configuration alternatives and the resulting logical volume configuration trees that represent a given storage configuration alternative. This background discussion is followed by a discussion of FIGS. 1B and 1C in detail.

Storage Configuration Alternatives

Figure 2:
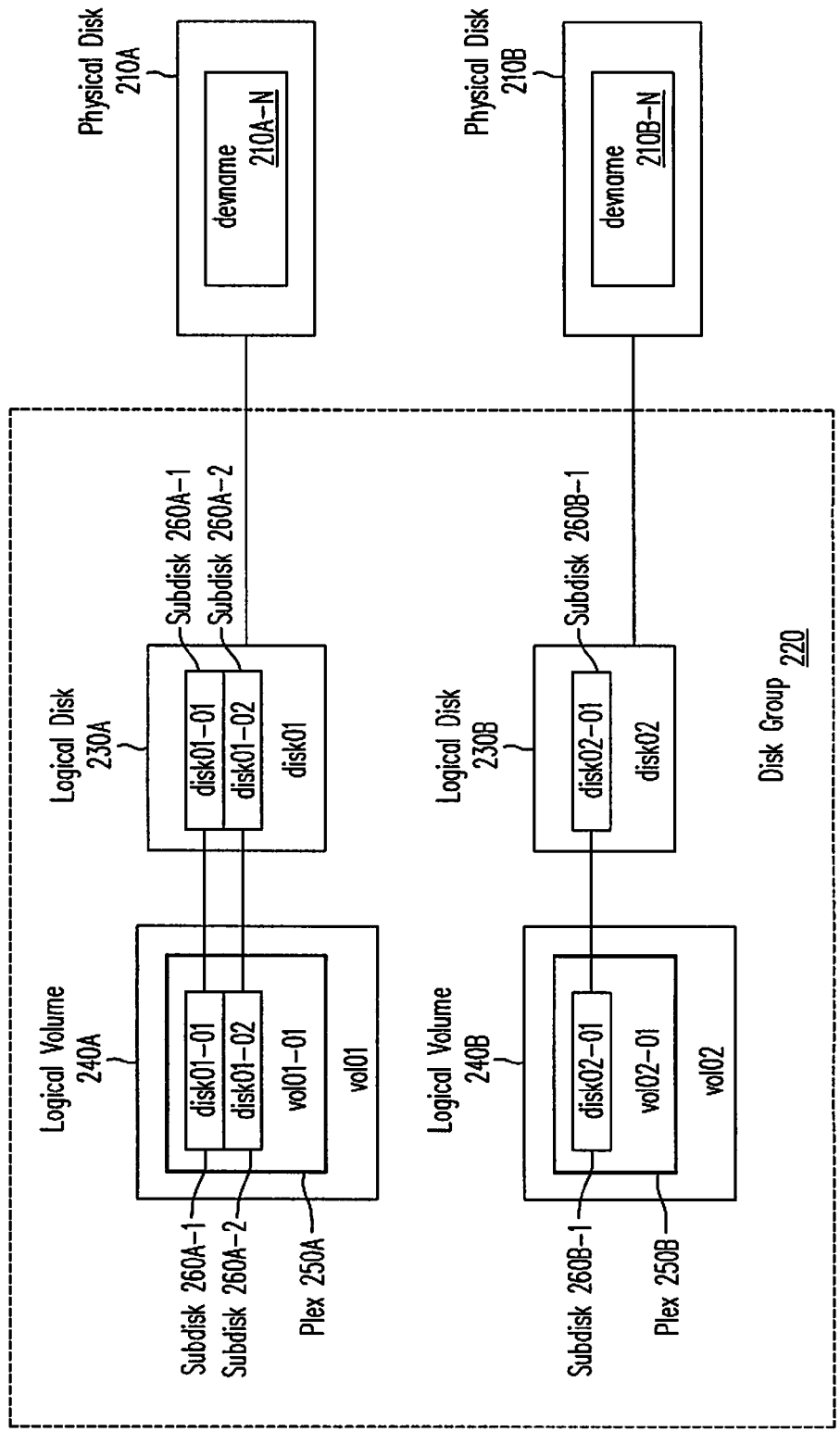

FIG. 2 shows an example configuration of two logical volumes showing relationships between physical disks, disk groups, logical disks, plexes, subdisks, and logical volumes. A physical disk is the basic storage device upon which the data are stored. A physical disk has a device name, sometimes referred to as devname, that is used to locate the disk. A typical device name is in the form c#t#d#, where c# designates the controller, t# designates a target ID assigned by a host to the device, and d# designates the disk number. At least one logical disk is created to correspond to each physical disk.

A logical volume is a virtual disk device that can be comprised of one or more physical disks. A logical volume appears to file systems, databases, and other application programs as a physical disk, although the logical volume does not have the limitations of a physical disk. In this example, two physical disks 210A and 210B, having respective device names 210A-N and 210B-N, are configured to provide two logical volumes 240A and 240B, having respective names vol01 and vol02.

A logical volume can be composed of other virtual objects, such as logical disks, subdisks, and plexes. As mentioned above, at least one logical disk is created to correspond to each physical disk, and a disk group is made up of logical disks. Disk group 220 includes two logical disks 230A and 230B, with respective disk names disk01 and disk02, each of which corresponds to one of physical disks 210A and 210B. A disk group and its components can be moved as a unit from one host machine to another. A logical volume is typically created within a disk group.

A subdisk is a set of contiguous disk blocks and is the smallest addressable unit on a physical disk. A logical disk can be divided into one or more subdisks, with each subdisk representing a specific portion of a logical disk. Each specific portion of the logical disk is mapped to a specific region of a physical disk. Logical disk space that is not part of a subdisk is free space. Logical disk 230A includes two subdisks 260A-1 and 260A-2, respectively named disk01-01 and disk01-02, and logical volume 230B includes one subdisk 260B-1, named disk 02-01.

A plex includes one or more subdisks located on one or more physical disks. A logical volume includes one or more plexes, with each plex holding one copy of the data in the logical volume. Logical volume 240A includes plex 250A, named vol01-01, and the two subdisks mentioned previously as part of logical disk 230A, subdisks 260A-1 and 260A-2. Logical volume 240B includes one plex 250B, named vol02-01, and subdisk 260B-1.

None of the associations described above between virtual objects making up logical volumes are permanent; the relationships between virtual objects can be changed. For example, individual disks can be added on-line to increase plex capacity, and individual volumes can be increased or decreased in size without affecting the data stored within.

Data can be organized on a set of subdisks to form a plex (a copy of the data) by concatenating the data, striping the data, mirroring the data, or striping the data with parity. Each of these organizational schemes is discussed briefly below. With concatenated storage, several subdisks can be concatenated to form a plex, as shown above for plex 250A, including subdisks 260A-1 and 260A-2. The capacity of the plex is the sum of the capacities of the subdisks making up the plex. The subdisks forming concatenated storage can be from the same logical disk, but more typically are from several different logical/physical disks.

Further discussion of storage configurations and equivalent logical volume configuration trees are described with reference to FIGS. 3A through 7 below.

Striped Storage

Figure 3A:
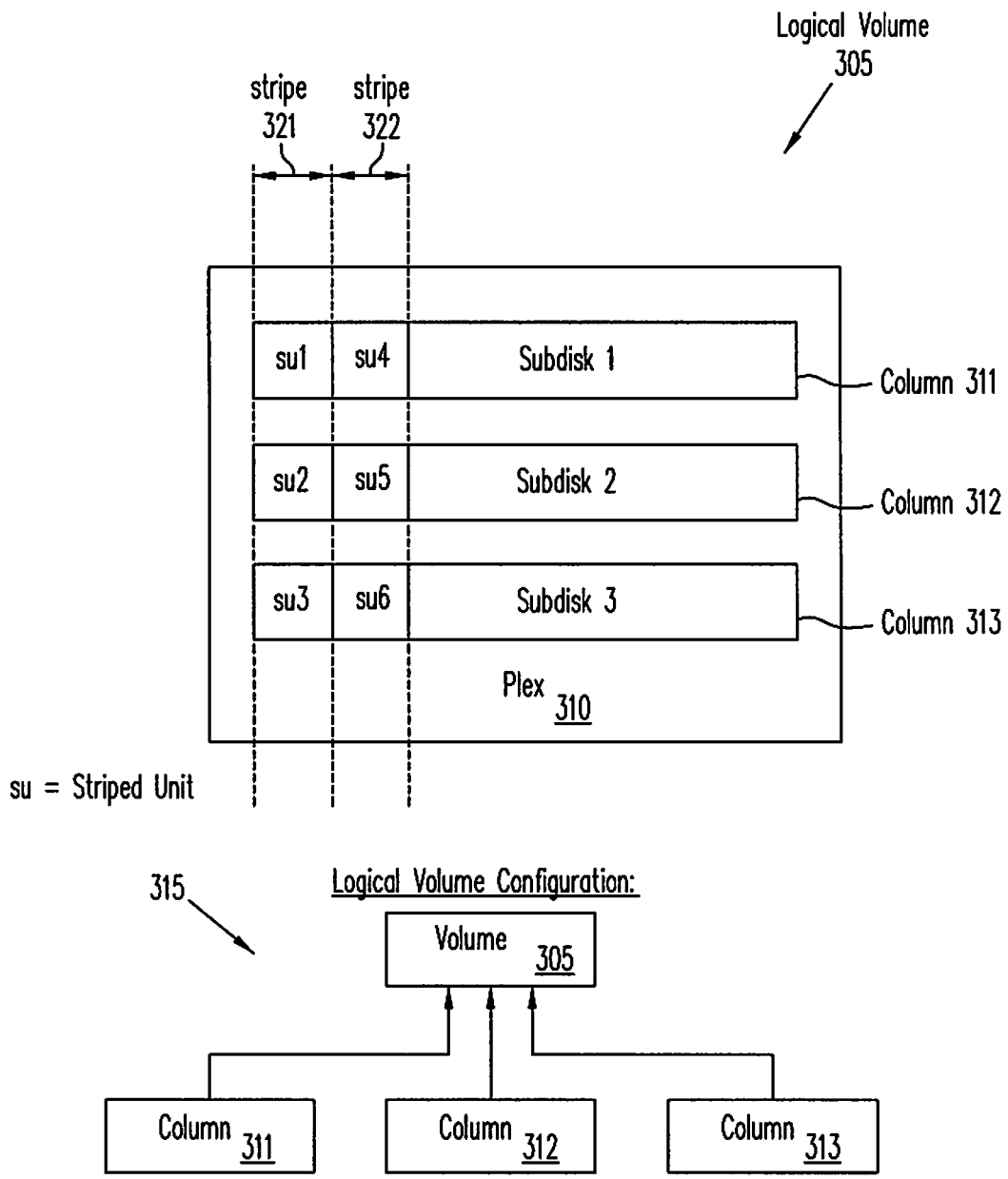
FIG. 3A shows an example of a striped storage configuration and corresponding logical volume configuration.

FIG. 3A shows an example of a striped storage configuration. Striping maps data so that the data are interleaved among two or more physical disks. Striped storage distributes logically contiguous blocks of a plex, in this case plex 310, more evenly over all subdisks (here, subdisks 1, 2 and 3) than does concatenated storage. Data are allocated alternately and evenly to the subdisks, such as subdisks 1, 2 and 3 of plex 310. Subdisks in a striped plex are grouped into "columns," with each physical disk limited to one column. A plex, such as plex 310, is laid out in columns, such as columns 311, 312 and 313.

With striped storage, data are distributed in small portions called "stripe units," such as stripe units su1 through su6. Each column has one or more stripe units on each subdisk. A stripe includes the set of stripe units at the same positions across all columns. In FIG. 3A, stripe units 1, 2 and 3 make up stripe 321, and stripe units 4, 5 and 6 make up stripe 322. Thus, if n subdisks make up the striped storage, each stripe contains n stripe units. If each stripe unit has a size of m blocks, then each stripe contains m*n blocks.

Logical volume configuration 315 shows an example of a logical volume configuration hierarchy, also referred to as a "tree," for volume 305. Logical volume 305 is made up of three columns, columns 311, 312, and 313. Each of columns 311, 312, and 313 can be considered to be a "leaf node" of the logical volume configuration tree.

Striped storage has capacity, maximum bandwidth, and maximum I/O rate that is the sum of the corresponding values of its constituent disks (not subdisks). Moreover, striped storage reliability is n times less than one disk when there are n disks. However, since striping distributes the blocks more finely over all subdisks-in chunks of stripe units rather than chunks equal to a full subdisk size—hot spots that are repeatedly updated in a short period of time are less likely to develop. For example, if a volume using four subdisks is occupied by a dozen database tables, the stripe size will be much smaller than a table. A heavily (but uniformly) accessed table will result in all subdisks being accessed evenly, so no hot spot will develop.

Mirrored Storage

Bandwidth and I/O rate of mirrored storage depend on the direction of data flow. Performance for mirrored storage read operations is additive-mirrored storage that uses n plexes will give n times the bandwidth and I/O rate of a single plex for read requests. However, the performance for write requests does not scale with number of plexes. Write bandwidth and I/O rate is a bit less than that of a single plex. Each logical write must be translated to n physical writes to each of the n mirrors. All n writes can be issued concurrently, and all will finish in about the same time. However, since each request is not likely to finish at exactly the same time (because each disk does not receive identical I/O requests—each disk gets a different set of read requests), one logical write will take somewhat longer than a physical write. Therefore, average write performance is somewhat less than that of a single subdisk. If write requests cannot be issued in parallel, but happen one after the other, write performance will be n times worse than that of a single mirror. Read performance does improve with an increasing number of mirrors because a read I/O need be issued only to a single plex, since each plex stores the same data.

Mirrored storage is less useful in terms of capacity or performance. Its forte is increased reliability, whereas striped or concatenated storage gives decreased reliability. Mirrored storage gives improved reliability because it uses storage redundancy. Since there are one or more duplicate copies of every block of data, a single disk failure will still keep data available.

Mirrored data will become unavailable only when all mirrors fail. The chance of even two disks failing at about the same time is extremely small provided enough care is taken to ensure that disks will fail in an independent fashion (for example, do not put both mirrored disks on a single fallible power supply).

In case a disk fails, the disk can be hot-swapped (manually replaced on-line with a new working disk). Alternatively, a hot standby disk can be deployed. A hot standby disk (also called hot spare) is placed in a spare slot in the disk array but is not activated until needed. In either case, all data blocks must be copied from the surviving mirror on to the new disk in a mirror rebuild operation. Mirrored storage is vulnerable to a second disk failure before the mirror rebuild.

Figure 3B:
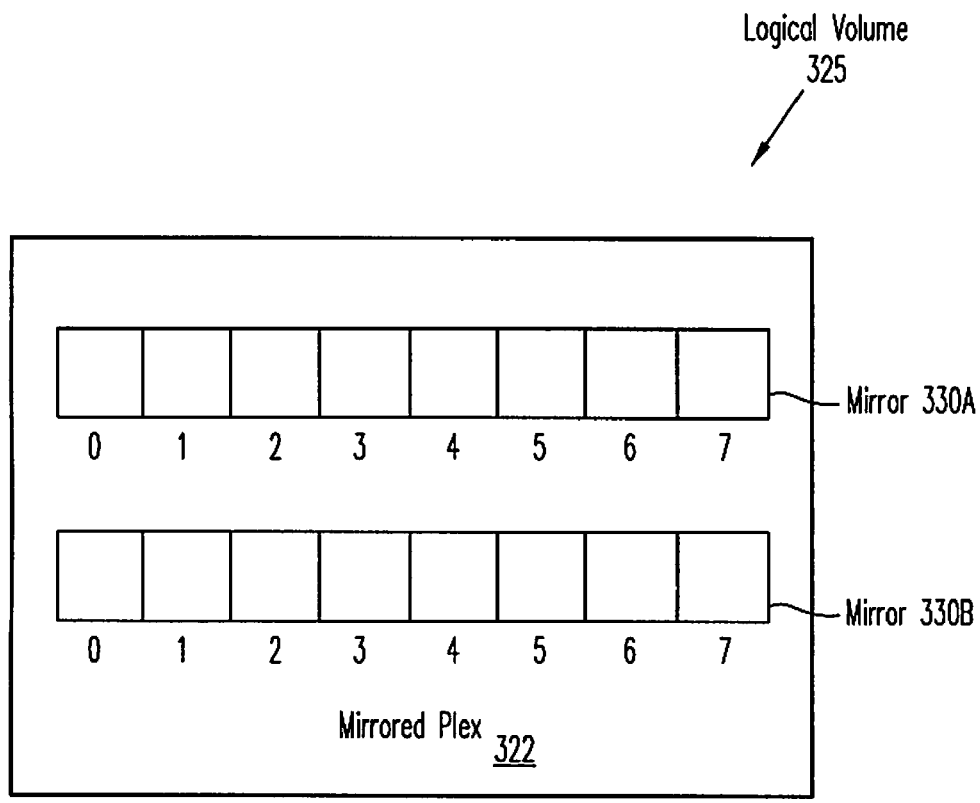
FIG. 3B shows an example of a mirrored storage configuration and corresponding logical volume configuration.
Figure 3B:
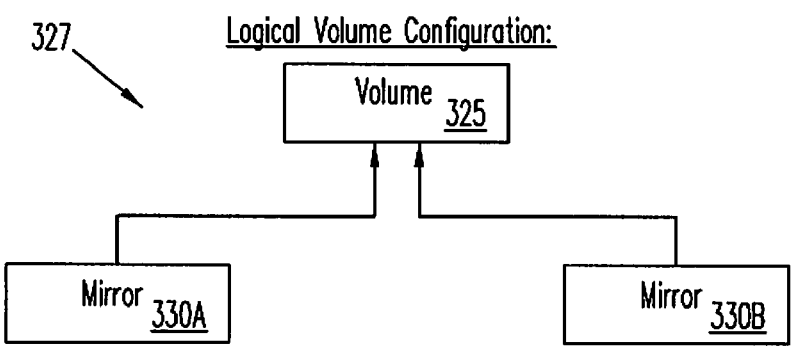

FIG. 3B shows a mirrored storage configuration. Mirrored storage replicates data over two or more plexes of the same size. A logical block number i of a volume maps to the same block number i on each mirrored plex. Mirrored storage with two mirrors corresponds to RAID-1 storage (explained in further detail below). Mirrored storage capacity does not scale—the total storage capacity of a mirrored volume is equal to the storage capacity of one plex.

In FIG. 3B, mirrored plex 322 contains two mirrors, mirror 330A and mirror 330B. Each mirror contains 8 blocks, labeled block 0 through block 7. Block 0 of mirror 330A corresponds to block 0 of mirror 330B, block 1 of mirror 330A corresponds to block 1 of mirror 330B, and so on.

Logical volume configuration for logical volume 325 is shown in logical volume configuration tree 327. As shown, volume 325 includes two mirrors, mirror 330A and 330B. Mirrors 330A and 330B can be considered to be "leaf nodes" of logical volume configuration tree 327.

Redundant Array of Independent Disks (RAID) Storage

Another type of storage uses RAID (redundant array of independent disks; originally redundant array of inexpensive disks). RAID storage is a way of storing the same data in different places (thus, redundantly) on multiple hard disks. By placing data on multiple disks, I/O operations can overlap in a balanced way, improving performance. Since multiple disks increase the mean time between failure (MTBF), storing data redundantly also increases fault tolerance.

A RAID appears to the operating system to be a single logical hard disk. RAID employs the technique of striping, which involves partitioning each drive's storage space into units ranging from a sector (512 bytes) up to several megabytes. The stripes of all the disks are interleaved and addressed in order. Striped storage, as described above, is also referred to as RAID-0 storage, which is explained in further detail below.

In a single-user system where large records, such as medical or other scientific images, are stored, the stripes are typically set up to be small (such as 512 bytes) so that a single record spans all disks and can be accessed quickly by reading all disks at the same time. In a multi-user system, better performance requires establishing a stripe wide enough to hold the typical or maximum size record. This configuration allows overlapped disk I/O across drives.

Several types of RAID storage are described below. RAID-0 storage has striping but no redundancy of data. RAID-0 storage offers the best performance but no fault-tolerance.

RAID-1 storage, as described above with reference to FIG. 3B, is also known as disk mirroring and consists of at least two drives that duplicate the storage of data. There is no striping. Read performance is improved since either disk can be read at the same time. Write performance is the same as for single disk storage. RAID-1 storage provides the best performance and the best fault-tolerance in a multi-user system.

RAID-3 storage uses striping and dedicates one subdisk to storing parity information. Embedded error checking information is used to detect errors. Data recovery is accomplished by calculating the exclusive OR (XOR) of the information recorded on the other subdisks. Since an I/O operation addresses all subdisks at the same time, input/output operations cannot overlap with RAID-3 storage. For this reason, RAID-3 storage works well for single-user systems with data stored in long data records. In RAID-3, a stripe spans n subdisks; each stripe stores data on n−1 subdisks and parity on the remaining subdisk. A stripe is read or written in its entirety.

Figure 4:
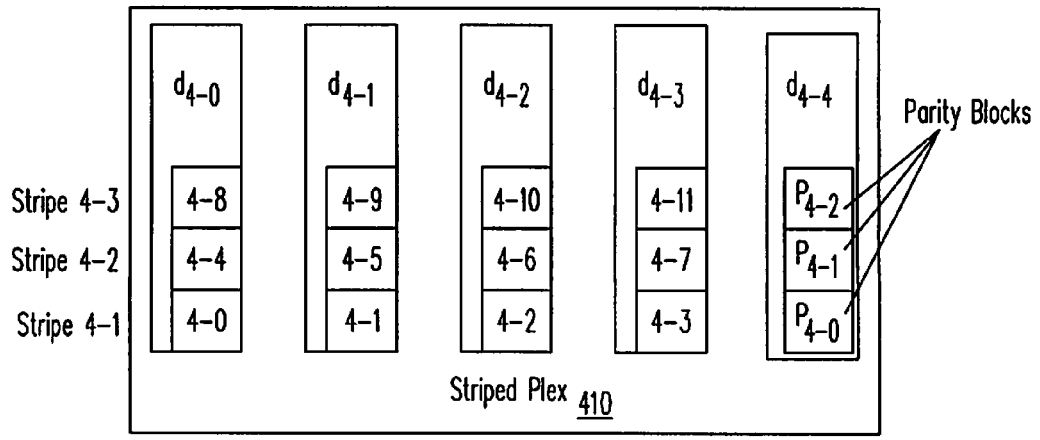
Figure 4:
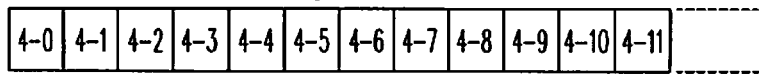

FIG. 4 shows a RAID-3 storage configuration. Striped plex 410 includes subdisks $d_{4-0}$ through $d_{4-4}$. Subdisks $d_{4-0}$ through $d_{4-3}$ store data in stripes 4-1, 4-2 and 4-3, and subdisk $d_{4-4}$ stores parity data in parity blocks $P_{4-0}$ through $P_{4-2}$. The logical view of plex 410 is that data blocks 4-0 through 4-11 are stored in sequence. The logical volume configuration tree (not shown) for FIG. 4 is similar to that shown in FIG. 3A (which shows a striped storage configuration).

RAID-3 storage capacity equals n−1 subdisks, since one subdisk capacity is used for storing parity data. RAID-3 storage works well for read requests. Bandwidth and I/O rate of an n-way RAID-3 storage is equivalent to (n−1)-way striped storage. Write request behavior is more complicated. The minimum unit of I/O for RAID-3 is equal to one stripe. If a write request spans one stripe exactly, performance is least impacted. The only overhead is computing contents of one parity block and writing it, thus n I/Os are required instead of n−1 I/Os for an equivalent (n−1)-way striped storage. A small write request must be handled as a read-modify-write sequence for the whole stripe, requiring 2n input/output operations.

RAID-3 storage provides protection against one disk failure. As in mirrored storage, a new disk must be brought in and its data rebuilt. However, rebuilding data is costlier than for mirrors because it requires reading all n−1 surviving disks.

RAID-5 storage includes a rotating parity array, thus allowing all read and write operations to be overlapped. RAID-5 stores parity information but not redundant data (because parity information can be used to reconstruct data). RAID-5 typically requires at least three and usually five disks for the array. RAID-5 storage works well for multi-user systems in which performance is not critical or which do few write operations. RAID-5 differs from RAID-3 in that the parity is distributed over different subdisks for different stripes, and a stripe can be read or written partially.

Figure 5:
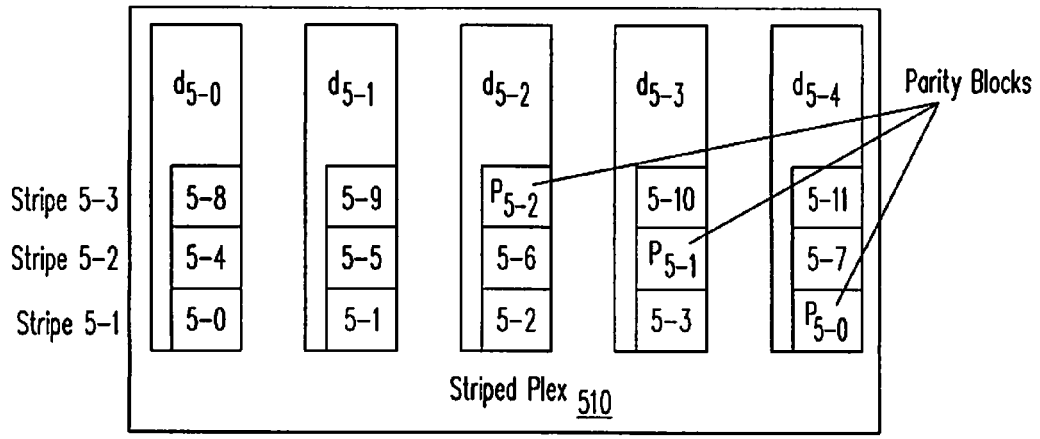
Figure 5:
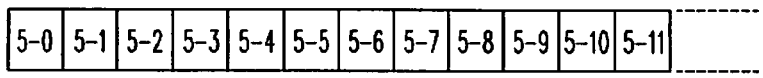

FIG. 5 shows an example of a RAID-5 storage configuration. Striped plex 510 includes subdisks $d_{5-0}$ through $d_{5-4}$. Each of subdisks $d_{4-0}$ through $d_{4-4}$ stores some of the data in stripes 5-1, 5-2 and 5-3. Subdisks $d_{5-2}$, $d_{5-3}$, and $d_{5-4}$ store parity data in parity blocks $P_{5-0}$ through $P_{5-2}$. The logical view of plex 510 is that data blocks 5-0 through 5-11 are stored in sequence. The logical volume configuration tree (not shown) for FIG. 5 is similar to that shown in FIG. 3A (which shows a striped storage configuration).

Figure 6:
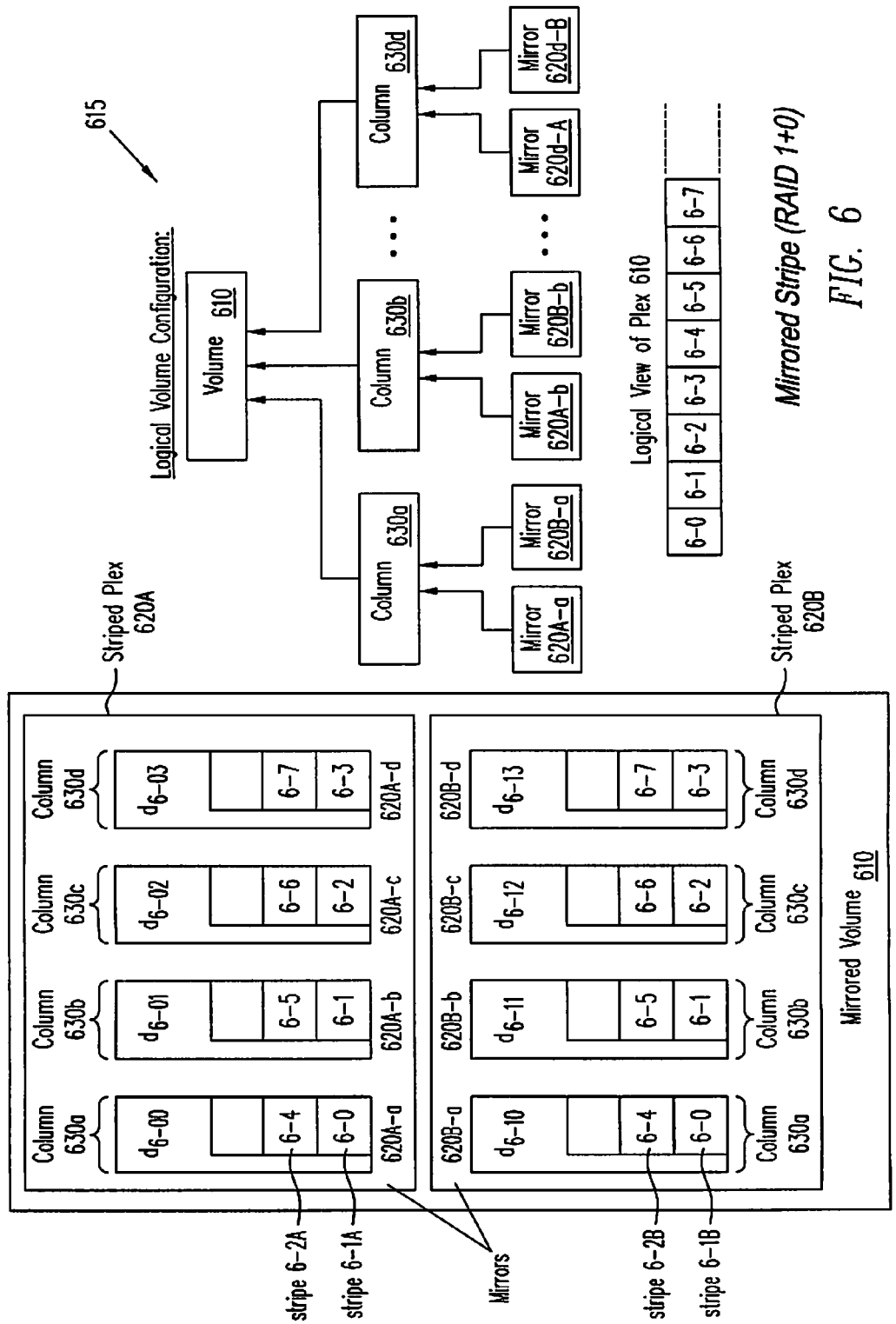

FIG. 6 shows an example of a mirrored-stripe (RAID-1+0) storage configuration. In this example, two striped storage plexes of equal capacity, plexes 620A and 620B, are mirrors of each other and form a single volume 610. Each of plexes 620A and 620B provides large capacity and performance, and mirroring provides higher reliability. Each of plexes 620A and 620B contains data stored in four columns, labeled columns 630a through 630d. Typically, each plex in a mirrored-stripe storage configuration resides on a separate disk array. Ideally, the disk arrays have independent I/O paths to the host computer so that there is no single point of failure.

Plex 620A includes subdisks $d_{6-00}$ through $d_{6-03}$, and plex 620B includes subdisks $d_{6-10}$ through $d_{6-13}$. Plex 620A contains one copy of data blocks 6-0 through 6-7, and plex 620B contains a mirror copy of data blocks 6-0 through 6-7. Data for one of columns 630a through 630d is contained in each mirror. For example, data for plex 620A are stored in mirrors 620A-a, 620A-b, 620A-c, and 620A-d, with each respective mirror containing data for a respective column 630a through 630d. Similarly, data for plex 620B are stored in mirrors 620B-a, 620B-b, 620B-c, and 620B-d, with each respective mirror containing data for a respective column 630a through 630d. Each plex includes two stripes; plex 620A includes stripes 6-1A and 6-2A, and plex 620B includes corresponding mirrored stripes 6-1B and 6-2B.

Logical volume configuration tree 615 shows volume 610, containing four columns, 630a through 630d. Each column contains two mirrors; for example, column 630a contains mirrors 620A-a and 620B-a and column 630b contains mirrors 620A-b and 620B-b. Stripe 6-1A of plex 620A is mirrored by stripe 6-1B of plex 620B, and stripe 6-2A of plex 620A is mirrored by strip 6-2B of plex 620B. The logical view of plex 610 is that data blocks 6-0 through 6-11 are stored in sequence.

RAID-5 storage capacity equals n−1 subdisks, since one subdisk capacity is used up for storing parity data. RAID-5 storage works well for read requests. Bandwidth and I/O rate of an n-way RAID-5 storage is equivalent to n-way striped storage. The multiplication factor is n− rather than n−1 as in the case of RAID-3—because the parity blocks are distributed over all disks. Therefore, all n disks contain useful data as well, and all can be used to contribute to total performance. RAID-5 works the same as RAID-3 when write requests span one or more full stripes. For small write requests, however, RAID-5 uses four disk I/Os:

Read1 old data
Read2 parity
Compute new parity=XOR sum of old data, old parity, and new data
Write3 new data
Write4 new parity Latency doubles since the reads can be done in parallel, but the writes can be started only after the read requests finish and parity is computed. Note that the two writes must be performed atomically. Therefore, I/O requests to a single stripe are serialized even though they are to non-overlapping regions. The application will not ensure this, since it is required to serialize I/O only to overlapping regions. In addition, writes are logged in a transaction to make them atomic in case the server or storage devices fail.

RAID-5 storage provides protection against one disk failure. As with mirrored storage, a new disk must be brought in and its data rebuilt. As with RAID-3 storage, all n−1 surviving disks must be read completely to rebuild the new disk.

Due to the overhead involved with RAID, RAID storage is best implemented in intelligent disk arrays that can use special parity computation hardware and non-volatile caches to hide RAID write latencies from the host computer. As is the case with mirrored storage, RAID storage is also vulnerable with respect to host computer crashes while write requests are being made to disks. A single logical request can result in two to n physical write requests; parity is always updated. If some writes succeed and some do not, the stripe becomes inconsistent. Additional techniques can be used to make these physical write requests atomic.

Figure 7:
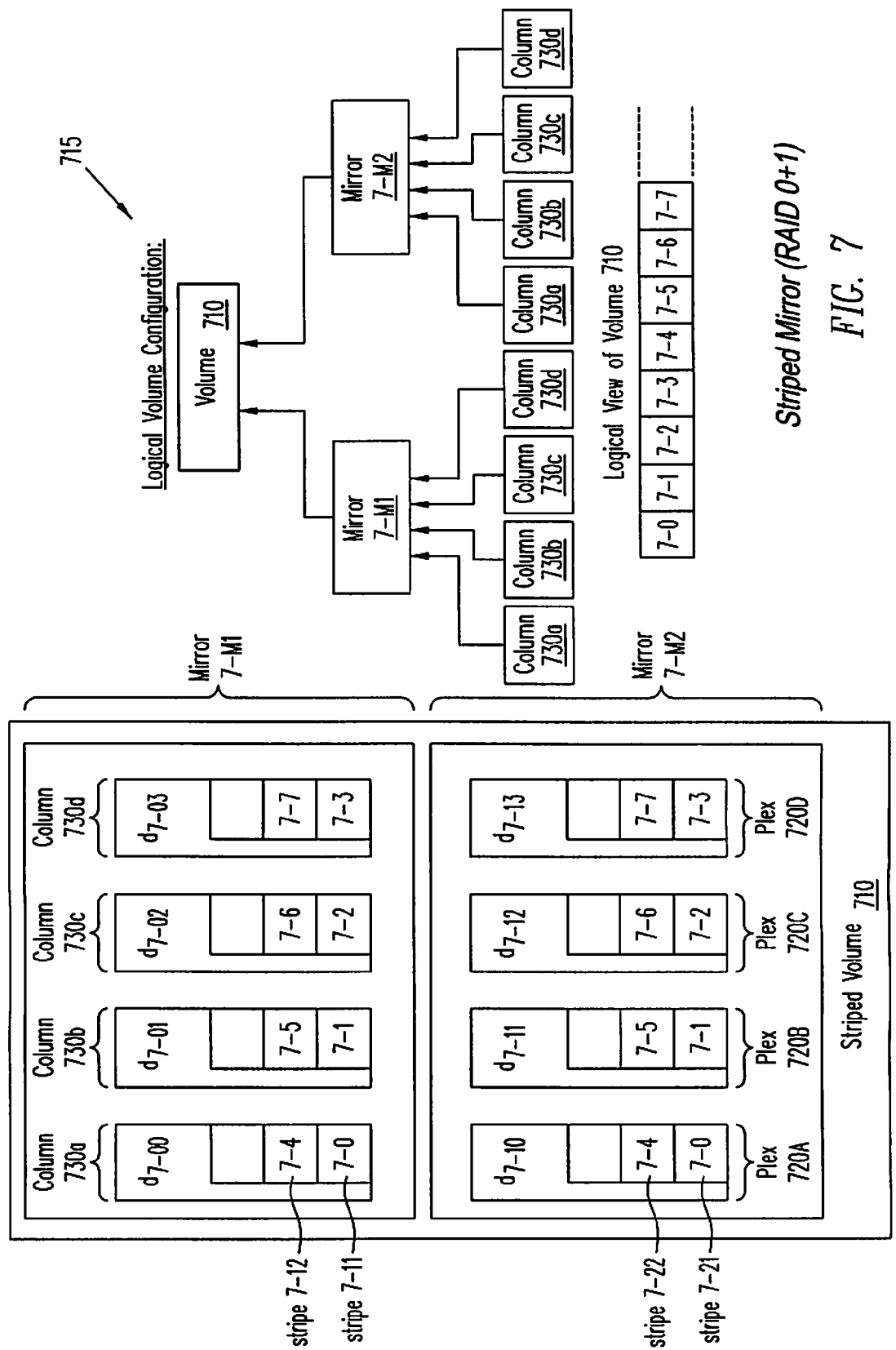

FIG. 7 shows an example of a striped-mirror (RAID-0+1) storage configuration. Each of plexes 720A through 720D contains a pair of mirrored subdisks. For example, plex 720A contains subdisks $d_{7-00}$ and $d_{7-10}$, and each of subdisks $d_{7-00}$ and $d_{7-10}$ contains a mirror copy of data blocks 7-0 and 7-4. Across all plexes 720A through 720D, each data block 7-0 through 7-7 is mirrored. Data for each plex contains a mirrored copy of data for one of columns 730a through 730d.

Plexes 720A through 720D are aggregated using striping to form a single volume 710. Stripe 7-11 is mirrored as stripe 7-21, and stripe 7-12 is mirrored as stripe 7-22. The logical view of volume 710 is that data blocks 7-0 through 7-7 are stored sequentially. Each plex provides reliability, and striping of plexes provides higher capacity and performance.

Logical volume configuration tree 715 shows volume 710 containing two mirrors, labeled mirror 7-M1 and 7-M2. Each mirror contains data for columns 730*a* through 730*d*. Leaf nodes for logical volume configuration tree 715 represent columns.

As described above, FIGS. 6 and 7 illustrate the mirrored-stripe and striped-mirror storage, respectively. Though the two levels of aggregation are shown within a logical volume configuration, intelligent disk arrays can be used to provide one of the two levels of aggregation. For example, striped mirrors can be set up by having the volume manager perform striping over logical disks exported by disk arrays that mirror the logical disks internally.

For both mirrored stripes and striped mirrors, storage cost is doubled due to two-way mirroring. Mirrored stripes and striped mirrors are equivalent until there is a disk failure. If a disk fails in mirrored-stripe storage, one whole plex fails; for example, if disk $d_{6-02}$ of FIG. 6 fails, plex 620A is unusable. After the failure is repaired, the entire failed plex 620A is rebuilt by copying from the good plex 620B. Further, mirrored-stripe storage is vulnerable to a second disk failure in the good plex, here plex 620B, until the failed mirror, here mirror 620A, is rebuilt.

On the other hand, if a disk fails in striped-mirror storage, no plex is failed. For example, if disk $d_{7-00}$ of FIG. 7 fails, the data in data blocks 7-0 and 7-4 are still available from mirrored disk $d_{7-10}$. After the disk $d_{7-00}$ is repaired, only data of that one disk $d_{7-00}$ need to be rebuilt from the other disk $d_{7-10}$. Striped-mirror storage is also vulnerable to a second disk failure, but the chances are n times less (where n=the number of columns) because striped-mirrors are vulnerable only with respect to one particular disk (the mirror of the first failed disk; in this example, $d_{7-10}$). Thus, striped mirrors are preferable over mirrored stripes.

Alternative storage configurations and equivalent logical volume configuration trees have been described with reference to FIGS. 3A through 7. The following discussion describes using the logical volume configuration tree, intent, and rules to reserve suitable replacement storage devices for a given logical volume. The example logical volume of FIGS. 1A through 1C is discussed in further detail below in the context of identifying and reserving replacement storage devices that preserve the intent of the original logical volume creator.

Identification and Reservation of Storage Devices Preserving Intent of Logical Volume Returning to FIG. 1B, a more detailed example of the contents of logical volume 120 of FIG. 1A is provided. Assume that the user has specified that the storage allocated must be capable of surviving the failure of one path to a storage device and meeting high performance standards, as reflected in intent 140.

Available storage information 180 indicates that the storage environment in which the logical volume is to be configured includes the following: a striped disk array, Disk Array A, has ten columns (disks) across which data can be dispersed, one path to each disk, and a controller C3; Disk Array B includes fifteen disks, a controller C1, and one path to each disk; and Disk Array C includes three disks, one path to each disk, and a controller C4; and Disk Array D has one path to each of 15 disks and a controller C2.

None of the storage devices available provides multiple paths, so path reliability is implemented by using a different storage device for each set of mirrors. To meet intent 140, Disk Array A alone is not suitable, unless configured using software, because Disk Array A does not provide either 15 columns or mirroring. Disk Array B has 16 disks available for striping and one controller, but is not striped. Disk Array C includes only three disks, not sufficient for providing the 30 disks that are needed. Disk Array D provides a second controller and another 16 disks. The combination of disk arrays B and D is selected to implement the logical volume, and logical volume configuration 170 is produced. Mirrored stripes are added using software configuration.

In this example, path reliability is implemented using a PathReliabilityThroughMirroring template because no arrays with multiple paths are available. Note that rules 150 includes rules for configuring mirrored stripes (mirrors within stripes), where each stripe has two mirrors and each mirror is on a separate controller. This configuration will require only two different controllers, because one set of mirrors will be placed under the control of one controller, and the other set of mirrors will be placed under control of the other controller. An alternative rules 150 may reverse the order of the rules to produced striped mirrors (stripes within mirrors). Such an implementation would also require two controllers, one for each mirror copy of data.

Logical volume configuration 170 is produced using rules 150 and available storage information 180. When logical volume configuration tree 170 is determined, the intent 140 of the user is preserved, to be stored in physical storage device(s) 110 along with the logical volume 120 as part of "Data Stored with Logical Volume" 130. Intent 140 can include user requirements 141, as well as information 142, such as rules and templates selected and variable values used to implement the logical volume 120. Intent 140 is preserved for reuse in the event that the logical volume's configuration is changed, for example, by adding additional storage devices, resizing the volume, or evacuating data from the volume. Rules stored within intent 140 are used to reconfigure logical volume 120 such that logical volume 120 continues to conform to the rules. By consistently conforming to the rules, consistent performance and availability can be guaranteed, for example, to fulfill contractual availability requirements of storage service level agreements.

Logical volume configuration tree 170 includes a volume level, fifteen columns, and thirty mirrors (two for each column). Logical volume configuration trees for different types of storage configurations are discussed further with reference to FIGS. 3A through 7 below. Rules 150 and available storage information 130 are used to produce commands 160 to configure a logical volume having the logical volume configuration tree 170. Similarly, rules 150 and available storage information 180 are used to produce commands to reserve suitable physical storage devices to serve as replacement storage devices for logical volume 120. These commands are executed to configure a logical volume and reserve replacement storage devices from one or more physical storage devices 110.

Commands 160 to create 30 subdisks are first issued, with each command indicating an identifier for a respective disk (d1 through d15 of either Disk Array B or Disk Array D) to be used. The 30 mirrors are then created, and each subdisk is associated with a respective mirror. For example, subdisk d1 of Disk Array B is associated with mirror M1; and subdisk d30 of Disk Array D is associated with mirror M30. Mirrors are then associated with columns; mirrors M1 (disk 1 of Disk Array B) and M2 (disk 1 of Disk Array D) are each associated with column 1, mirrors M3 (disk 2 of Disk Array B) and M4 (disk 2 of Disk Array D) are associated with column 2, and so on. The two mirrored copies of the data are controlled by different controllers, so that it is likely that at least one of the mirrored copies of the data will be available.

A plex is then created using a stripe_unit_width of 128K bytes, such that data for each column is written to the plex in units of 128K bytes. Each of the 15 columns is associated with the plex because data from all 15 columns are needed to provide a complete copy of the data. A logical volume is created and the plex is associated with the logical volume. The logical volume configuration tree 170 and resulting logical volume 130 created thus meets intent 140.

FIG. 1C shows examples of commands used to reserve replacement storage devices for the logical volume of FIGS. 1A and 1B. In this example, the user has provided user requirements that are the same as those of FIG. 1B, as well as submitted a reservation request 143 (shown within intent 140) to reserve physical storage devices to provide replacement storage space should one of the devices for the logical volume fail.

The same available storage information 180 and rules 150 are used to produce the same logical volume configuration tree 170 as was produced for FIG. 1B. Commands 160 now include additional commands 161 for reservation of subdisks to serve as replacement devices and commands 162 which identify particular devices to serve as replacement devices for given leaf nodes of the logical volume configuration tree 170. Commands 161 create two subdisks, with subdisk rsd1 associated with disk 16 of Disk Array B and subdisk rsd2 associated with disk 16 of Disk Array D. Commands 162 reserve these subdisks as replacement disks for mirrors M1 through M30. The process of reserving particular devices to serve as replacements for devices storing leaf nodes of a logical volume configuration tree is discussed in further detail below with reference to FIGS. 8A through 9B.

FIG. 8A is a flowchart for reserving replacement storage space at the time of logical volume creation in accordance with one embodiment of the present invention. At "Obtain User Requirements" step 820, functional requirements for a logical volume are obtained from a user. The term 'user' is used herein to indicate either a person or a software module that uses the storage allocation services of the present invention. The term 'user requirements' is used herein to indicate a high-level description of at least one characteristic of the logical volume. User requirements need not include directions for implementing the requested characteristics, as the best implementation to provide the desired characteristics can be determined by a storage allocator, as described with reference to co-pending application Ser. No. 10/327,380 (entitled "Development Of A Detailed Logical Volume Configuration From High-Level User Requirements," as described and incorporated by reference above. More information about the storage allocator described therein is provided with reference to FIG. 10 below.

In one embodiment, user requirements are provided in the form of an allocation language described in co-pending application Ser. No. 10/327,558, filed on Dec. 20, 2002, entitled "Language For Expressing Storage Allocation Requirements" and naming Chirag Deepak Dalal, Vaijayanti Rakshit Bharadwaj, Pradip Madhukar Kulkarni, and Ronald S. Karr as inventors, the application being incorporated herein by reference in its entirety.

User requirements can be provided by a person using a graphical user interface (GUI). In other embodiments, user requirements may be obtained from other types of interfaces, such as a command line interface, or from another software module.

Control proceeds from "Obtain User Requirements" step 820 to "Obtain Available Storage Information" step 830, where information is gathered about the available storage for implementing the user requirements. This information can be gathered from storage devices directly attached to the host running the system software, via a network from other hosts directly attached to other storage devices, and from servers on a storage area network. Obtaining storage requirements is also described in application Ser. No. 10/327,380 (entitled "Development Of A Detailed Logical Volume Configuration From High-Level User Requirements," as described and incorporated by reference above).

Control proceeds from "Obtain Available Storage Information" step 830 to "Determine Logical Volume Configuration (including Intent and Rules for Logical Volume) to Meet User Requirements using Storage Information" step 840. In step 840, the available storage information is searched for storage suitable for providing the specified user requirements. From the available storage, a logical volume configuration is determined that can be used to implement the user requirements using the available storage devices.

From "Determine Logical Volume Configuration (including Intent and Rules for Logical Volume) to Meet User Requirements using Storage Information" step 840, control proceeds to "Identify Physical Storage Devices to Configure Logical Volume" step 850. Identifying physical storage devices for configuring a logical volume was discussed in detail in co-pending application Ser. No. 10/327,380 (entitled "Development Of A Detailed Logical Volume Configuration From High-Level User Requirements," as described and incorporated by reference above.

From "Identify Physical Storage Devices to Configure Logical Volume" step 850, control proceeds to "Sufficient Suitable Space" decision point 852. If sufficient space is unavailable to configure the logical volume, control proceeds to "Alert User of Allocation Error" step 854. Information is provided to the user indicating that sufficient physical devices are not available to create the logical volume in accordance with the intent specified.

At "Sufficient Suitable Space" decision point 852, if sufficient space is available to configure the logical volume, control proceeds to "Generate Commands to Configure Logical Volume" step 860. In step 860, commands are generated to configure the logical volume in accordance with the logical volume configuration determined in "Determine Logical Volume Configuration (including Intent and Rules for Logical Volume) to Meet User Requirements using Storage Information" step 840. Control then proceeds to "Execute Commands to Implement Logical Volume Configuration in Hardware and/or Software" step 870.

In "Execute Commands to Implement Logical Volume Configuration in Hardware and/or Software" step 870, the logical volume configuration is used to execute the commands generated in "Generate Commands to Configure Logical Volume" step 860. The series of commands is executed to configure available storage devices to provide a logical volume to meet the user requirements.

From "Execute Commands to Implement Logical Volume Configuration in Hardware and/or Software" step 870, control proceeds to "Reservation Request" decision point 872. If no request to reserve replacement devices was made at the time of the request to create the logical volume, the logical volume creation process ends. If a request to reserve replacement devices was made, control proceeds to "Eliminate Physical Storage Devices in Use from Scope of Search for Identifying Devices" step 874. In the embodiment shown, devices to be used for replacement storage devices in the event of device failure or for adding space to a logical volume are not used for storing other data. Control then proceeds to "Identify Physical Storage Devices to Reserve" step 880.

In "Identify Physical Storage Devices to Reserve" step 880, physical storage devices meeting the intent of the logical volume are identified. "Identify Physical Storage Devices to Reserve" step 880 is discussed in further detail with reference to FIG. 9A below. From "Identify Physical Storage Devices to Reserve" step 880, control proceeds to "Insufficient Reserved Space Alert" decision point 882. If an insufficient space alert has been raised in "Identify Physical Storage Devices to Reserve" step 880, control proceeds to "Alert User of Allocation Error" step 854. Information is provided to the user indicating that sufficient physical devices are not available to reserve the space requested for the logical volume in accordance with the intent specified.

If an insufficient space alert was not raised at "Insufficient Reserved Space Alert" decision point 882, control proceeds to "Generate Commands to Reserve Space" step 890. In a manner similar to that of "Generate Commands to Configure Logical Volume" step 870, commands to reserve space in accordance with the intent of the volume are generated. The commands to reserve space may be generated concurrently with the commands to configure the logical volume in "Generate Commands to Configure Logical Volume" step 860. Control then proceeds to "Execute Commands to Reserve Space" step 892, where the commands generated in "Generate Commands to Reserve Space" step 890 are executed to reserve the requested storage space. The commands to reserve space may be executed concurrently with the commands to implement the logical volume configuration in "Execute Commands to Implement Logical Volume Configuration in Hardware and/or Software" step 870. The process of reserving physical storage devices and creation of the logical volume ends.

FIG. 8B is a flowchart for performing other types of operations on logical volumes in accordance with one embodiment of the present invention. In "Obtain Available Storage Information" step 830, information is gathered about the available storage for implementing the user requirements, as described above with reference to FIG. 8A. This information can be gathered from storage devices directly attached to the host running the system software, via a network from other hosts directly attached to other storage devices, and from servers on a storage area network. Control proceeds to "Obtain Intent and Rule for Logical Volume" step 841. In step 841, an intent for the logical volume and one or more rules used to initially configure the logical volume are obtained. For example, as described above the intent and rules can be stored with the logical volume and obtained by reading the data stored with the logical volume. Control then proceeds to "Determine Storage Space Needed for Operation on Volume using Intent and Rules" step 843. The amount of storage space required to perform the operation is calculated based upon the intent and rules of the logical volume and the available storage information. For example, the operation may be a request to replace a failed disk, in which case the size of the failed disk can be determined. Alternatively, the operation may be a request to add a certain amount of space to a logical volume, in which case the user will provide the amount of space.

From Determine Storage Space Needed for Operation on Volume Using Intent and Rules" step 843, control proceeds to "OK to Use Reserved Space" decision point 845. For some operations, such as replacement of a failed disk, a physical storage device may have been reserved specifically for that purpose. In an emergency, however, it may be necessary to use some of the free space reserved for other purposes. If permission is given at "OK to Use Reserved Space" decision point 845, control proceeds to "Set Scope of Search to Reserved Physical Storage Devices" step 849. The scope of the search for devices in the following step "Identify Reserved Physical Storage Devices to Use for Operation" step 851 is set to include reserved physical devices. Suitable reserved devices can be identified in conformance with the intent and rules of the logical volume and using the additional storage information, as described with reference to identifying suitable devices for configuring the logical volume. In "Identify Reserved Physical Storage Devices to Use for Operation" step 851, reserved devices are identified that meet the intent of the logical volume.

From "Identify Reserved Physical Storage Devices to Use for Operation" step 851, control proceeds to "Sufficient Reserved Space" decision point 853. At "Sufficient Reserved Space" decision point 853, if sufficient reserved space is not available to perform the operation, control proceeds to "Add Reserved Physical Storage Devices to Scope of Search" step 855. The scope of the search for physical devices is set to include the physical storage devices that are reserved, in addition to other physical storage devices that are available. Control then proceeds to "Identify Suitable Physical Storage Devices to Use for Operation" step 857.

At "Sufficient Reserved Space" decision point 853, if sufficient reserved space are available to perform the operation, control proceeds to "Generate Commands to Perform Operation Using Identified Devices" step 891. "Generate Commands to Perform Operation Using Identified Devices" step 891 is described in further detail below.

At "OK to Use Reserved Space" decision point 845, if permission to use the reserved devices is not given, control proceeds to "Exclude Reserved Physical Storage Devices from Scope of Search" step 847. In this step, reserved physical devices are excluded from the scope to be performed in "Identify Suitable Physical Storage Devices to Use for Operation" step 857.

"Identify Suitable Physical Storage Devices to Use for Operation" step 857 can be reached from "Sufficient Suitable Space" decision point 852 when sufficient unreserved space is sufficient to allocate the logical volume, from "Suitable Reserved Space" step 853 when sufficient reserved space is available to perform the operation, or from "Add Reserved Physical Storage Devices to Scope of Search" step 855, when insufficient reserved devices are available and the remaining physical storage devices are to be searched for additional suitable devices. Suitable devices can be identified in conformance with the intent and rules of the logical volume and using the additional storage information, as described in co-pending application Ser. No. 10/327,380 (entitled "Development Of A Detailed Logical Volume Configuration From High-Level User Requirements," as described and incorporated by reference above. The result of "Identify Suitable Physical Storage Devices to Use for Operation" step 857 is either the identification of suitable devices for performing the operation or an allocation error when sufficient suitable devices cannot be found.

From "Identify Suitable Physical Storage Devices to Use for Operation" step 857, control proceeds to "Sufficient Suitable Space" decision point 858. If sufficient space is unavailable to configure the logical volume, control proceeds to "Alert User of Allocation Error" step 859. Information is provided to the user indicating that sufficient physical devices are not available to perform the operation in accordance with the intent of the logical volume.

At "Sufficient Suitable Space" decision point 858, if sufficient space is available to perform the operation, control proceeds to control proceeds to "Generate Commands to Perform Operation Using Identified Devices" step 891.

At "Generate Commands to Perform Operation Using Identified Devices" step 891, commands to perform the operation are generated in a manner similar to that of "Generate Commands to Configure Logical Volume" step 870 of FIG. 8A. These commands to perform the operation are generated in conformance with the intent of the volume. Control then proceeds to "Execute Commands to Perform Operation Using Identified Devices" step 893, where the commands generated in "Generate Commands to Perform Operation Using Identified Devices" step 890 are executed to perform the operation.

In one embodiment of the invention, physical storage devices are reserved and can be instantly obtained whenever an operation requires allocation of additional physical storage devices and/or replacement of a failed physical storage device. The supported operations include the following:
  Creating logical volumes
  Growing logical volumes online
  Creating/Adding logs to logical volumes
  Adding mirrors to logical volumes online
  Relocating a logical volume sub-disk
  Reconfiguring logical volume layout
  Creating software snapshot
  Creating hardware snapshot
  Providing support for intelligent storage array policies A configuration for a logical volume can be specified using rules, templates, capabilities, and/or user templates, also referred to herein as application-specific templates. To ensure that a logical volume meets user requirements, a combination of physical characteristics of some storage devices and software configuration of other storage devices using rules can be used to provide all capabilities meeting the user requirements. Rules, templates, capabilities, and user templates are described in further detail in co-pending application Ser. No. 10/325,418), filed on Dec. 20, 2002, entitled "Adaptive Implementation Of Requested Capabilities For A Logical Volume" and naming Chirag Deepak Dalal, Vaijayanti Rakshit Bharadwaj, Pradip Madhukar Kulkarni, and Ronald S. Karr as inventors, the application being incorporated herein by reference in its entirety. Application-specific templates are further described in co-pending application Ser. No. 10/327, 535, filed on Dec. 20, 2002, entitled "Intermediate Descriptions of Intent for Storage Allocation" and naming Chirag Deepak Dalal, Vaijayanti Rakshit Bharadwaj, Pradip Madhukar Kulkarni, Ronald S. Karr, and John A. Colgrove as inventors, the application being incorporated herein by reference in its entirety.

FIG. 9A is a flowchart showing the operation of the "Identify Physical Storage Devices to Reserve" step of the flowchart of FIG. 8A. In "Traverse Logical Volume Configuration Tree," step 910, a logical volume configuration tree such as those shown in FIGS. 3A through 7 is traversed. Each node in the tree is examined and, at "Leaf Node" decision point 920, a determination is made whether the current node is a leaf node. If not, control returns to "Traverse Logical Volume Configuration Tree," step 910 to continue to traverse the logical volume configuration tree to the next leaf node. If the current node is a leaf node, control proceeds to "More than One Leaf Node with Same Intent and Rules" decision point 930. If the current leaf node is one of a set of leaf nodes that all have the same intent and rules, only one physical storage device may be reserved to serve as a backup disk for all similar leaf nodes. When more than one leaf node exists, control proceeds to "Select Representative Leaf Node" step 940, where a representative leaf node of the set is selected.

An example of a set of leaf nodes having the same intent and rules was provided with reference to the example of FIG. 1C. In FIG. 1C, thirty mirrors, M1 through M30, exist at the leaf level of logical volume configuration tree 170. Intent 140 and rules 150 are common to each of mirrors M1 through M30, although a "separateby Controller" relationship exists between the two sets of mirrors. For example, because mirrors M1 and M2 are each mirrors for column 1, mirrors M1 and M2 must be controlled by different controllers to satisfy the path reliability component of intent 140. As a result, the same replacement device cannot be reserved for both mirrors M1 and M2. This relationship is reflected in commands 162, which show subdisk rsd1 being reserved for odd-numbered mirrors M1 through M29, and subdisk rsd2 being reserved for even-numbered mirrors M2 through M30. M1 can be considered as the representative leaf node for mirrors M1 through M29, and M2 can be considered as the representative leaf node for mirrors M2 through M30. The intent for M1 is used to find an appropriate replacement storage device for all odd-numbered mirrors having the same intent, and the intent for M2 is used to find an appropriate storage device for all even-numbered mirrors with the same intent. If any odd-numbered mirror fails, reserved subdisk rsd1 will be used as a replacement storage device, and if any even-numbered mirror fails, reserved subdisk rsd2 will be used as a replacement storage device.

Returning to FIG. 9A, at "More than One Leaf Node with Same Intent and Rules" decision point 930, if only one leaf node exists with the same intent and rules, control proceeds to "Select Current Leaf Node" step 932, where the current leaf node is selected. From each of "Select Representative Leaf Node" step 940 and "Select Current Leaf Node" step 932, control proceeds to "Identify Physical Storage Devices to Reserve for Selected Leaf Node" step 950. An example of one implementation of "Identify Physical Storage Devices to Reserve for Selected Leaf Node" step 950 is described with reference to FIG. 9B.

After processing "Identify Physical Storage Devices to Reserve for Selected Leaf Node" step 950, the physical devices to reserve have been identified or an insufficient space alert has been raised. If an insufficient space alert has been raised as determined at "Insufficient Space Alert" decision point 960, control proceeds to "Return Insufficient Reserved Space Alert" step 980. Insufficient space exists to reserve the amount of space required for the respective leaf node, and a flag is raised so that the user can be notified, as described with reference to FIG. 8A. If no alert was raised at "Insufficient Space Alert" decision point 960, control proceeds to "Last Node" decision point 990. If the current node is the last node in the configuration tree, control proceeds to "Return Identified Suitable Physical Storage Devices for All Leaf Nodes" step 992, where the identified devices for each leaf node are returned. If the current node is not the last leaf node, control returns to "Traverse Logical Volume Configuration Tree," step 910 to continue to traverse the logical volume configuration tree to the next leaf node.

FIG. 9B is a flowchart of the "Identify Physical Storage Devices to Reserve for Selected Leaf Node" step of the flowchart of FIG. 9A. In "Find Physical Storage Device with Largest Usage" step 931, the largest possible replacement physical storage device (or number of regions or blocks) that may be needed for the particular column or mirror of the logical volume represented by the current leaf node is determined. Control then proceeds to "Set Amount of Storage Space Needed for Leaf Node to Size of Largest Usage" step 941, where the amount of storage space needed is set to be the size of the physical storage device (or regions or blocks) identified in "Find Physical Storage Device with Largest Usage" step 931. This amount of storage indicates the largest number of storage devices (or regions or blocks of one or more physical storage devices) that may be needed in the event of failure of the physical storage device with the largest usage. By reserving space that may be more than is required, availability of replacement disks that meet the intent of the logical volume is assured.

From "Set Amount of Storage Space Needed for Leaf Node to Size of Largest Usage" step 941, control proceeds to "Identify Available Devices Within Scope" step 951. For example, the scope was limited at several points in FIGS. 8A and 8B to include or exclude particular physical storage devices. For example, physical storage devices that are already in use for storing this particular leaf node cannot be included in the allocation for backup physical storage devices, as those physical storage devices are not available. Control then proceeds to "Sufficient Space" decision point 861. If sufficient space is unavailable to reserve for the leaf node, control proceeds to "Return Insufficient Reserved Space Alert" step 981. Information is provided to the user indicating that sufficient physical devices are not available to reserve the space for this leaf node in accordance with the intent of the logical volume.

At "Sufficient Space" decision point 971, if sufficient space is available to reserve for the leaf node, control proceeds to "Identify Suitable Physical Storage Devices for Leaf Node" step 971. Physical storage devices are identified for the leaf node. Only devices that satisfy the intent of the logical volume are allocated, and the particular devices (or regions or blocks) identified can be associated as reserved for the corresponding leaf node. The reserved physical storage devices, regions, or blocks can be marked to indicate that they are reserved for a particular leaf node.

It is possible that an emergency situation may occur in which reserved physical storage devices, regions, or blocks are used to perform critical operations. In such a case, it is desirable to free unused storage space and reserve additional storage space as soon as possible to ensure continuous and consistent availability of the data.

Example Architecture

FIG. 10 is a diagram of a system implementing one embodiment of the present invention. Storage allocator 1000 is composed of different modules that communicate using well-defined interfaces; in one embodiment, storage allocator 1000 is implemented as a storage allocation service. An allocation coordinator 1010 coordinates communication among the various modules that provide the functionality of storage allocator 1000. In the above-described embodiment, allocation coordinator 1010 includes a set of interfaces to the storage allocation service implementing storage allocator 1000. A user interface (UI) 1002 is provided to enable users to provide user requirements for a logical volume.

Allocation coordinator 1010 obtains data from configuration database 1004, which includes data about templates, capabilities, rules, and policy database 1006, which contains information about storage environment policies. An example of a policy is a specification of a stripe unit width for creating columns in a striped virtual object; for example, columns of a striped volume may be configured having a default stripe unit width of 128K. Allocation coordinator 1010 also obtains information about the available storage environment from storage information collector 1015. As shown, storage information collector 1015 collects information from hosts for storage devices, such as host 1016 for storage device 1017, storage array 1018, and storage area network 1019. Information about available storage may be provided in the form of storage objects. Storage information collector 1015 may be considered to correspond to a storage information-obtaining module, means, and instructions.

Allocation coordinator 1010 communicates with a language processor 1020. Language processor 1020 interprets input in the form of the allocation specification language and input describing available storage information. Both allocation coordinator 1010 and language processor 1020 communicate with allocation engine 1030, which accepts input in the form of an allocation language specification and provides output to command processor 1040. In one embodiment, allocation engine 1030 provides output in the form of a logical volume configuration specified as a virtual object hierarchy or logical volume configuration tree, as described with reference to FIGS. 3A through 7.

Allocation engine 1030 automatically produces a logical volume configuration selects the hardware to be configured to produce the logical configuration. Allocation engine 1030 ensures that a logical volume conforms to a logical volume configuration both at the time of initial configuration and for each subsequent reconfiguration. Ensuring that a logical volume conforms to the logical volume configuration's rules consistently enables the logical volume to be consistently available. For example, the logical volume can be configured to meet a 99.99% level of availability if the appropriate capabilities and rules are used.

Command processor 1040 accepts input from allocation engine 1030 and produces commands that, when executed, create logical volume 1050 on physical storage device(s) 1060. Command processor 1040 also generates commands that reserve additional storage space for a newly-created logical volume such as logical volume 1050. As shown in this example, physical storage devices 1060 are accessible via storage area network 1019, although it is not necessary for operation of the invention that the storage devices used to implement the logical volume are accessible via a storage area network. For example, storage devices such as device 1017 could be configured to provide the logical volume.

Command processor 1040 generates and executes the commands to reserve additional storage space for a logical volume. As such, command processor 1040 can be considered to be a reserving module, means, and instructions. Similarly, because command processor 1040 identifies suitable storage devices to be reserved, command processor 1040 can be considered to be an identifying module, means, and instructions.

The functions performed by allocation engine 1030 are computationally expensive. The functionality of the system described above can be implemented in various system configurations. For example, a separate computer system may be designated to perform the functionality of allocation engine 1030. In such a configuration, allocation engine 1030 resides on a host different from the host for command processor 1040. An allocation proxy also can run on the host where command processor 1040 is running to provide the logical volume configuration in the form of a virtual object hierarchy to the remote command processor 1040.

A command processor, such as command processor 1040, takes a logical volume configuration in the form of a virtual object hierarchy as input and uses appropriate commands to create the volume. These commands are dependent upon the particular operating environment and storage devices in use. These commands are often provided by various interfaces to the storage devices.

Advantages of the present invention are many. The present invention uses an intent of the user originally allocating a logical volume to reserve additional storage devices for future use. The additional storage devices can be used upon failure of a physical storage device and/or as a physical storage device to increase a size of the logical volume. The additional storage devices may also be used to increase the amount of data that can be stored in the logical volume. Subsequent configurations of the logical volume can use reserved storage space to instantly reconfigure the logical volume such that the reconfiguration preserves the original intent. Reserving suitable backup storage space in advance ensures that the replacement storage space is available and conforms to the intent of the original logical volume.

The following section describes an example computer system and network environment in which the present invention may be implemented.

An Example Computing and Network Environment

FIG. 11 depicts a block diagram of a computer system 1110 suitable for implementing the present invention. Computer system 1110 includes a bus 1112 which interconnects major subsystems of computer system 1110, such as a central processor 1114, a system memory 1117 (typically RAM, but which may also include ROM, flash RAM, or the like), an input/output controller 1118, an external audio device, such as a speaker system 1120 via an audio output interface 1122, an external device, such as a display screen 1124 via display adapter 1126, serial ports 1128 and 1130, a keyboard 1132 (interfaced with a keyboard controller 1133), a storage interface 1134, a floppy disk drive 1137 operative to receive a floppy disk 1138, a host bus adapter (HBA) interface card 1135A operative to connect with a fibre channel network 1190, a host bus adapter (HBA) interface card 1135B operative to connect to a SCSI bus 1139, and an optical disk drive 1140 operative to receive an optical disk 1142. Also included are a mouse 1146 (or other point-and-click device, coupled to bus 1112 via serial port 1128), a modem 1147 (coupled to bus 1112 via serial port 1130), and a network interface 1148 (coupled directly to bus 1112).

Bus 1112 allows data communication between central processor 1114 and system memory 1117, which may include read-only memory (ROM) or flash memory (neither shown), and random access memory (RAM) (not shown), as previously noted. The RAM is generally the main memory into which the operating system and application programs are loaded and typically affords at least 66 megabytes of memory space. The ROM or flash memory may contain, among other code, the Basic Input-Output system (BIOS) which controls basic hardware operation such as the interaction with peripheral components. Applications resident with computer system 1110 are generally stored on and accessed via a computer readable medium, such as a hard disk drive (e.g., fixed disk 1144), an optical drive (e.g., optical drive 1140), floppy disk unit 1137 or other storage medium. Additionally, applications may be in the form of electronic signals modulated in accordance with the application and data communication technology when accessed via network modem 1147 or interface 1148.

Storage interface 1134, as with the other storage interfaces of computer system 1110, may connect to a standard computer readable medium for storage and/or retrieval of information, such as a fixed disk drive 1144. Fixed disk drive 1144 may be a part of computer system 1110 or may be separate and accessed through other interface systems. Modem 1147 may provide a direct connection to a remote server via a telephone link or to the Internet via an internet service provider (ISP). Network interface 1148 may provide a direct connection to a remote server via a direct network link to the Internet via a POP (point of presence). Network interface 1148 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., bar code readers, document scanners, digital cameras and so on). Conversely, it is not necessary for all of the devices shown in FIG. 11 to be present to practice the present invention. The devices and subsystems may be interconnected in different ways from that shown in FIG. 11. The operation of a computer system such as that shown in FIG. 11 is readily known in the art and is not discussed in detail in this application. Code to implement the present invention may be stored in computer-readable storage media such as one or more of system memory 1117, fixed disk 1144, optical disk 1142, or floppy disk 1138. Additionally, computer system 1110 may be any kind of computing device, and so includes personal data assistants (PDAs), network appliance, X-window terminal or other such computing devices. The operating system provided on computer system 1110 may be MS-DOS®, MS-WINDOWS®, OS/2®, UNIX®, Linux®, or another known operating system. Computer system 1110 also supports a number of Internet access tools, including, for example, an HTTP-compliant web browser having a JavaScript interpreter, such as Netscape Navigator®, Microsoft Explorer®, and the like.

Moreover, regarding the signals described herein, those skilled in the art will recognize that a signal may be directly transmitted from a first block to a second block, or a signal may be modified (e.g., amplified, attenuated, delayed, latched, buffered, inverted, filtered, or otherwise modified) between the blocks. Although the signals of the above described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block may be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

The foregoing described embodiment wherein the different components are contained within different other components (e.g., the various elements shown as components of computer system 1110). It is to be understood that such depicted architectures are merely examples, and that, in fact, many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

FIG. 12 is a block diagram depicting a network architecture 1200 in which client systems 1210, 1220 and 1230, as well as storage servers 1240A and 1240B (any of which can be implemented using computer system 1110), are coupled to a network 1250. Storage server 1240A is further depicted as having storage devices 1260A(1)-(N) directly attached, and storage server 1240B is depicted with storage devices 1260B (1)-(N) directly attached. Storage servers 1240A and 1240B are also connected to a SAN fabric 1270, although connection to a storage area network is not required for operation of the invention. SAN fabric 1270 supports access to storage devices 1280(1)-(N) by storage servers 1240A and 1240B, and so by client systems 1210, 1220 and 1230 via network 1250. Intelligent storage array 1290 is also shown as an example of a specific storage device accessible via SAN fabric 1270.

With reference to computer system 1110, modem 1147, network interface 1148 or some other method can be used to provide connectivity from each of client computer systems 1210, 1220 and 1230 to network 1250. Client systems 1210, 1220 and 1230 are able to access information on storage server 1240A or 1240B using, for example, a web browser or other client software (not shown). Such a client allows client systems 1210, 1220 and 1230 to access data hosted by storage server 1240A or 1240B or one of storage devices 1260A(1)-(N), 1260B(1)-(N), 1280(1)-(N) or intelligent storage array 1290. FIG. 12 depicts the use of a network such as the Internet for exchanging data, but the present invention is not limited to the Internet or any particular network-based environment.

OTHER EMBODIMENTS

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

The foregoing described embodiments include components contained within other components. It is to be understood that such architectures are merely examples, and that, in fact, many other architectures can be implemented which achieve the same functionality. In an abstract but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

The foregoing detailed description has set forth various embodiments of the present invention via the use of block diagrams, flowcharts, and examples. It will be understood by those within the art that each block diagram component, flowchart step, operation and/or component illustrated by the use of examples can be implemented, individually and/or collectively, by a wide range of hardware, software, firmware, or any combination thereof.

The present invention has been described in the context of fully functional computer systems; however, those skilled in the art will appreciate that the present invention is capable of being distributed as a program product in a variety of forms, and that the present invention applies equally regardless of the particular type of signal bearing media used to actually carry out the distribution. Examples of signal bearing media include recordable media such as floppy disks and CD-ROM, transmission type media such as digital and analog communications links, as well as media storage and distribution systems developed in the future.

The above-discussed embodiments may be implemented by software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably, or remotely coupled to a microprocessor/memory system. Thus, the modules may be stored within a computer system memory to configure the computer system to perform the functions of the module. Other new and various types of computer-readable storage media may be used to store the modules discussed herein.

The above description is intended to be illustrative of the invention and should not be taken to be limiting. Other embodiments are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the invention. Variations and modifications of the embodiments disclosed herein can be made based on the description set forth herein, without departing from the scope of the invention. Consequently, the invention is intended to be limited only by the scope of the appended claims, giving full cognizance to equivalents in all respects.

The invention claimed is:

1. A method comprising:
   identifying, based upon an intent associated with a logical volume, a first set of physical storage devices to reserve as backup for a second set of physical storage devices configured to provide the logical volume, wherein
   the second set of physical storage devices is configured using the intent associated with the logical volume, wherein the intent is obtained from a creator of the logical volume when the logical volume is being created and stored on the second set of physical storage devices, and wherein the intent comprises information identifying a set of characteristics specified by the creator of the logical volume, and
   each physical storage device of the first set of physical storage devices and the second set of physical storage devices conforms to the intent.

2. The method of claim 1 further comprising:
   reserving the first set of physical storage devices.

3. The method of claim 2 wherein
   the reserving the first set of physical storage devices occurs at a time that the second set of physical storage devices is configured to provide the logical volume.

4. The method of claim 2 further comprising:
   selecting a backup physical storage device of the first set of physical storage devices to replace a failed physical storage device of the second set of physical storage devices.

5. The method of claim 4 wherein
   the backup physical storage device conforms to the intent such that the selecting the backup physical storage device is performed without searching for the backup physical storage device.

6. The method of claim 2 further comprising:
   using a backup physical storage device of the first set of physical storage devices to increase a size of the logical volume.

7. The method of claim 1 wherein
the intent comprises a rule used to configure the second set of physical storage devices for the logical volume.

8. The method of claim 7 wherein the rule is stored with the logical volume when the logical volume is configured.

9. The method of claim 7 wherein the rule corresponds to a command used to configure the logical volume.

10. The method of claim 7 wherein the rule is used to identify the available physical storage devices to configure the logical volume.

11. The method of claim 7 wherein the rule is used to identify available physical storage devices from which the first set of physical storage devices is identified.

12. The method of claim 1 wherein
the intent is stored with the logical volume when the logical volume is configured.

13. The method of claim 1 wherein
the logical volume is created when the logical volume is configured.

14. The method of claim 1 further comprising:
providing availability of the logical volume by ensuring that the first set of physical storage devices is available and conforms to the intent of the logical volume.

15. The method of claim 14 wherein
the availability of the logical volume meets an availability requirement.

16. A system comprising:
identifying means for identifying, based upon an intent associated with a logical volume, a first set of physical storage devices to reserve as backup for a second set of physical storage devices configured to provide the logical volume, wherein
the second set of physical storage devices is configured using the intent associated with the logical volume, wherein the intent is obtained from a creator of the logical volume when the logical volume is being created and stored on the second set of physical storage devices, and wherein the intent comprises information identifying a set of characteristics specified by the creator of the logical volume, and
each physical storage device of the first set of physical storage devices and the second set of physical storage devices conforms to the intent; and
reserving means for reserving the first set of physical storage devices.

17. The system of claim 16 wherein
the reserving the first set of physical storage devices occurs at a time that the second set of physical storage devices is configured to provide the logical volume.

18. The system of claim 16 further comprising:
selecting means for selecting a backup physical storage device of the first set of physical storage devices to replace a failed physical storage device of the second set of physical storage devices.

19. A computer-readable storage medium comprising:
identifying instructions configured to identify, based upon an intent associated with a logical volume, a first set of physical storage devices to reserve as backup for a second set of physical storage devices configured to provide the logical volume, wherein
the second set of physical storage devices is configured using the intent associated with the logical volume, wherein the intent is obtained from a creator of the logical volume when the logical volume is being created and stored on the second set of physical storage devices, and wherein the intent comprises information identifying a set of characteristics specified by the creator of the logical volume, and
each physical storage device of the first set of physical storage devices and the second set of physical storage devices conforms to the intent.

20. The computer-readable storage medium of claim 19 further comprising:
reserving instructions configured to reserve the first set of physical storage devices.

21. The computer-readable storage medium of claim 20 wherein
the reserving the first set of physical storage devices occurs at a time that the second set of physical storage devices is configured to provide the logical volume.

22. The computer-readable storage medium of claim 20 further comprising:
selecting instructions configured to select a backup physical storage device of the first set of physical storage devices to replace a failed physical storage device of the second set of physical storage devices.

23. A system comprising:
an identifying module configured to identify, based upon an intent associated with a logical volume, a first set of physical storage devices to reserve as backup for a second set of physical storage devices configured to provide the logical volume, wherein
the second set of physical storage devices is configured using the intent associated with the logical volume, wherein the intent is obtained from a creator of the logical volume when the logical volume is being created and stored on the second set of physical storage devices, and wherein the intent comprises information identifying a set of characteristics specified by the creator of the logical volume, and
each physical storage device of the first set of physical storage devices and the second set of physical storage devices conforms to the intent.

24. The system of claim 23 further comprising:
a reserving module configured to reserve the first set of physical storage devices.

25. The system of claim 24 wherein
the reserving module reserves the first set of physical storage devices at a time that the second set of physical storage devices is configured to provide the logical volume.

26. The system of claim 24 further comprising:
a selecting module configured to select a backup physical storage device of the first set of physical storage devices to replace a failed physical storage device of the second set of physical storage devices.

* * * * *